US006488301B2

(12) United States Patent
Klassen et al.

(10) Patent No.: US 6,488,301 B2
(45) Date of Patent: *Dec. 3, 2002

(54) BICYCLE WHEEL TRAVEL PATH FOR SELECTIVELY APPLYING CHAINSTAY LENGTHENING EFFECT AND APPARATUS FOR PROVIDING SAME

(75) Inventors: James B. Klassen, Calgary (CA); Jamie W. Calon, Calgary (CA)

(73) Assignee: Santa Cruz Bicycles, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/756,150

(22) Filed: Jan. 5, 2001

(65) Prior Publication Data

US 2001/0024024 A1 Sep. 27, 2001

Related U.S. Application Data

(63) Continuation of application No. 09/039,135, filed on Mar. 13, 1998, now Pat. No. 6,206,397, which is a continuation-in-part of application No. 08/558,162, filed on Nov. 15, 1995, now Pat. No. 5,628,524, which is a continuation-in-part of application No. 08/377,931, filed on Jan. 25, 1995, now Pat. No. 5,553,881

(60) Provisional application No. 60/040,702, filed on Mar. 13, 1997.

(51) Int. Cl.[7] ............................................. B62K 25/28
(52) U.S. Cl. ................................................ 280/284
(58) Field of Search ........................... 280/283, 284, 280/285, 286, 275

(56) References Cited

U.S. PATENT DOCUMENTS

| 4,671,525 A | 6/1987 | Ribi |
| 4,789,042 A | 12/1988 | Pitts |
| 4,789,174 A | 12/1988 | Lawwill |
| 5,121,937 A | 6/1992 | Lawwill |
| 5,306,036 A | 4/1994 | Busby |
| 5,452,910 A | 9/1995 | Harris |

FOREIGN PATENT DOCUMENTS

| DE | 692011 | 6/1940 |
| FR | 933079 | 4/1948 |

*Primary Examiner*—Kevin Hurley
(74) *Attorney, Agent, or Firm*—Robert O. Guillot; Intellectual Property Law Offices

(57) ABSTRACT

A rear suspension system for a bicycle. The system directs the rear wheel along a predetermined, S-shaped path as the suspension is compressed. The path is configured to provide a chainstay lengthening effect only at those points where this is needed to counterbalance the pedal inputs of the rider; at those points in the wheel travel path where there is a chainstay lengthening effect, the chain tension which results from the pedal inputs exerts a downward force on the rear wheel, preventing unwanted compression of the suspension. The system employs a dual eccentric crank mechanism mounted adjacent the bottom bracket shell to provide the desired control characteristics.

36 Claims, 26 Drawing Sheets

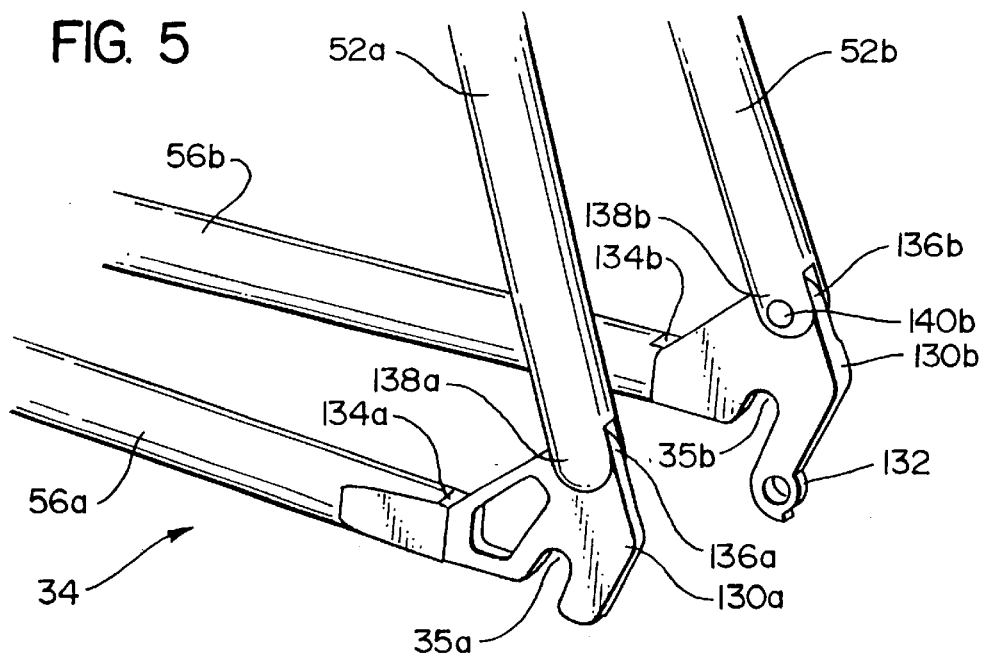
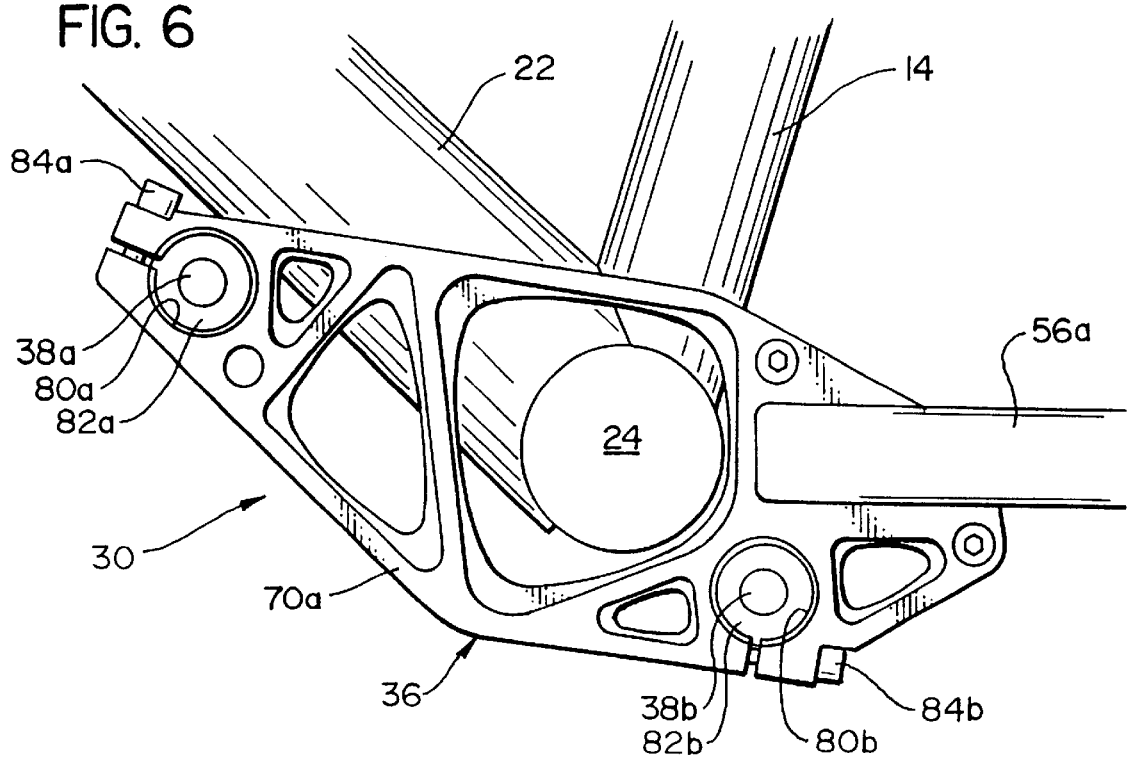

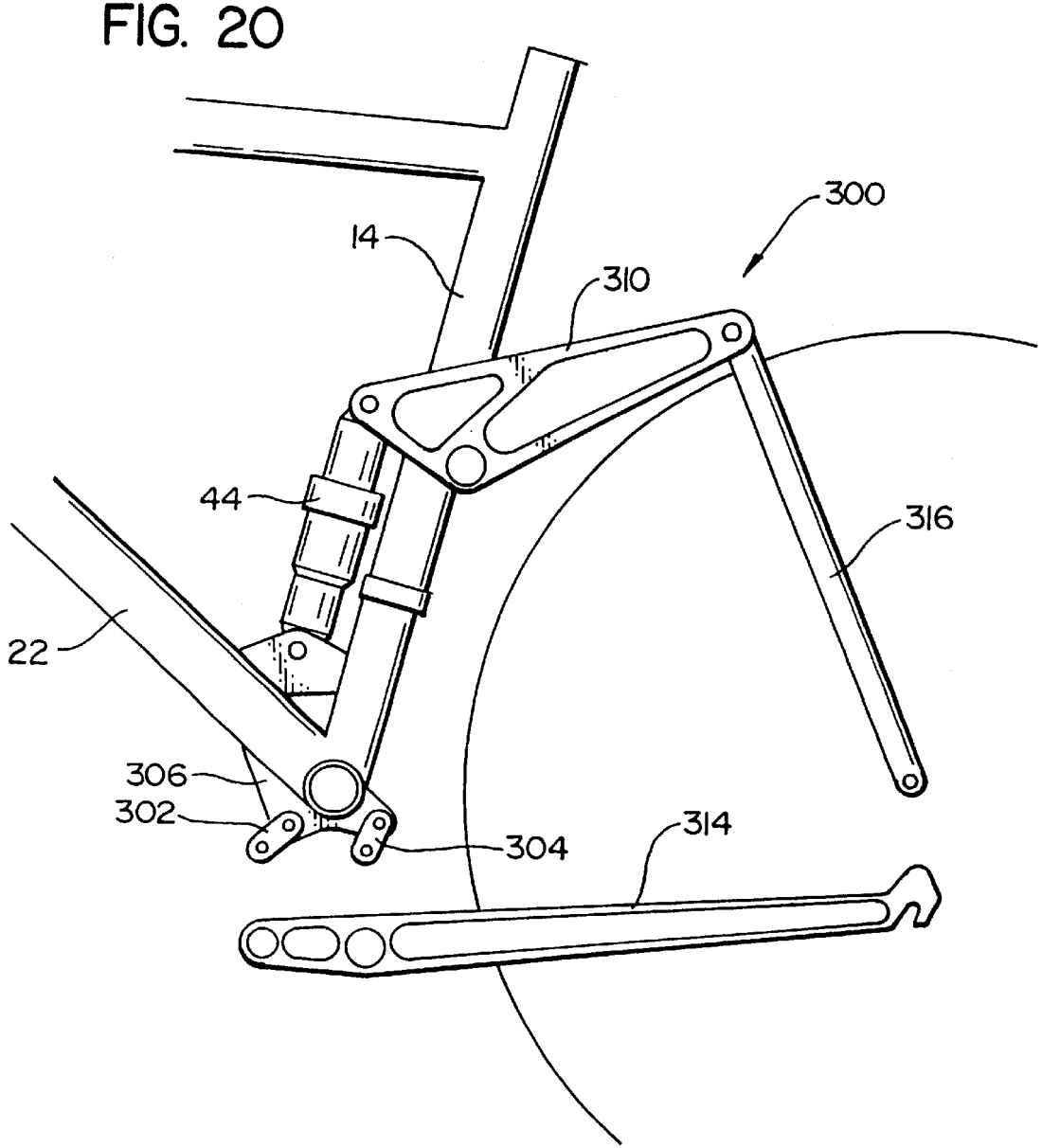

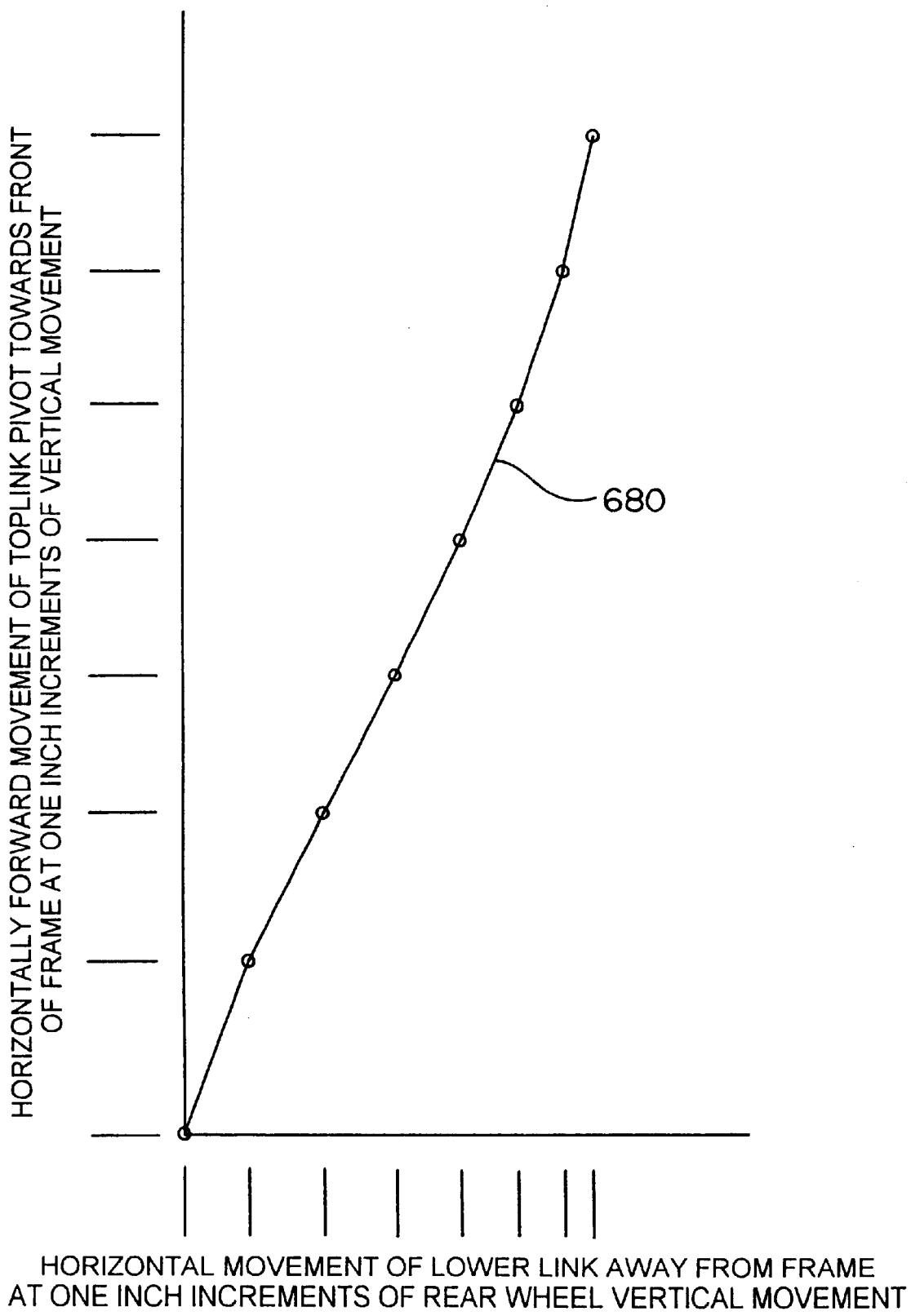

BICYCLE WHEEL TRAVEL PATH FOR SELECTIVELY APPLYING CHAINSTAY LENGTHENING EFFECT AND APPARATUS FOR PROVIDING SAME

This application is a continuation of U.S. Ser. No. 09/039,135 filed Mar. 13, 1998 now U.S. Pat. No. 6,206,397 which claims the benefit of provisional application No. 60/040,702 filed Mar. 13, 1997; which is a continuation-in-part of U.S. Ser. No. 08/558,162, filed Nov. 15, 1995 (U.S. Pat. No. 5,628,524, issued May 13, 1997); which is a continuation-in-part of U.S. Ser. No. 08/377,931, filed Jan. 25, 1995 (U.S. Pat. No. 5,553,881, issued Sep. 10, 1996).

FIELD OF THE INVENTION

The present invention relates generally to bicycles, and more particularly to a rear suspension system which provides efficient energy transmission but still provides compliant suspension action when the bicycle is ridden over rough terrain.

BACKGROUND OF THE INVENTION

Shock absorbing rear suspensions for bicycles are known. In general, however, these have not proven entirely satisfactory in practice.

In most rear suspension assemblies, the rear axle pivots about a single point when subjected to bump forces, as when traversing rough terrain. In these designs, the pedaling forces which are exerted by the rider tend to either compress or extend the spring/damper assembly of the rear suspension. In this respect, the spring/damper assembly of the rear suspension is affected by the pedal force and some of the rider's energy is needlessly wasted.

This effect manifests itself by the common tendency of rear suspension systems to either lock up or "squat" when the rider pedals. Since most of these systems have a single lever arm which pivots about a single axis, the lock up or squat generally occurs as a result of chain tension acting on the single lever arm. If the single pivot line is above the chain line, the suspension will typically lock up and/or "jack", thereby providing compliance only when the shock or bump force exceeds the chain tension. Conversely, if the single pivot point of the suspension system is below the chain line, the system will typically squat, since the chain tension is acting to compress the spring/damper assembly of the rear suspension system, similar to a shock or bump force.

SUMMARY OF THE INVENTION

The present invention has solved the problems cited above. Broadly, this is a bicycle comprising: a chain drive, in which the distance from the axis of a drive sprocket to the axis of a rear wheel hub is represented by a variable value CSL; and a compressible rear suspension having a linkage for moving the hub along a controlled wheel travel path as the suspension is compressed, the controlled wheel travel path having an arc radius which is greater towards a lower end of the path and smaller towards an upper end of the path.

The wheel travel path may comprise (a) a preferred pedaling position at a predetermined position Dp which is located along the rear travel path; (b) a lower curve segment below the position $D_p$ in which there is an increasing rate of chainstay lengthening with increasing compression of the suspension system, such that the first derivative relationship $$\frac{d[CSL]}{d(D)}$$

is a curve having a generally positive slope, so that the second derivative relationship $$\frac{d^2[CSL]}{(d(D))^2}$$

is generally positive; and (c) an upper curve segment above the position Dp in which there is a decreasing rate of chainstay lengthening with increasing compression of the suspension system, such that the first derivative relationship $$\frac{d[CSL]}{d(D)}$$

is a curve having a generally negative slope, so that the second derivative relationship $$\frac{d^2[CSL]}{(d(D))^2}$$

is generally negative.

The linkage may comprise upper and lower link members which connect a rear frame section to a forward frame section. The link members are pivotally mounted to the frame sections, with the upper link member extending in a downward and forward direction when the suspension is in an uncompressed position, and the lower link member extending in a downward and rearward direction in this position. The link members are mounted so as to rotate in opposite directions as the suspension is compressed.

A shock absorber may be mounted between the lower link member and the forward frame section so as to be compressed with compression of the rear suspension. The lower end of the shock absorber may be mounted to a second arm of the lower link member.

BRIEF DESCRIPTION OF THE DRAWINGS

FIG. 5 is an enlarged perspective view of the rearward portion of the suspension system which provides the mounting points for the rear wheel of the bicycle;

FIG. 6 is an elevational view of the bottom pivot portion of the suspension system;

FIG. 20 is an elevational view similar to FIG. 19, showing the lower swing arm assembly removed from the other components so as to more clearly show their interrelation;

FIG. 33 is a graph representing the horizontal forward and rearward movements of the rear frame of pivot attachments on the counter-rotating upper and lower link members, as measured incrementally against vertical movement of the rear wheel as the suspension system of FIGS. 30–31B is compressed.

DETAILED DESCRIPTION a. Overview

The present invention provides a rear suspension system which effectively absorbs forces which are received due to irregular terrain, but which minimizes the compression/extension of the suspension by forces which are applied by the rider during vigorous and/or uneven pedaling. This is accomplished by means of a dual eccentric crank mechanism which moves the rear wheel along a predetermined path as the suspension is compressed, so that the chain tension works to counteract the downward forces on the frame during selected phases of the compression cycle.

Figure 1:
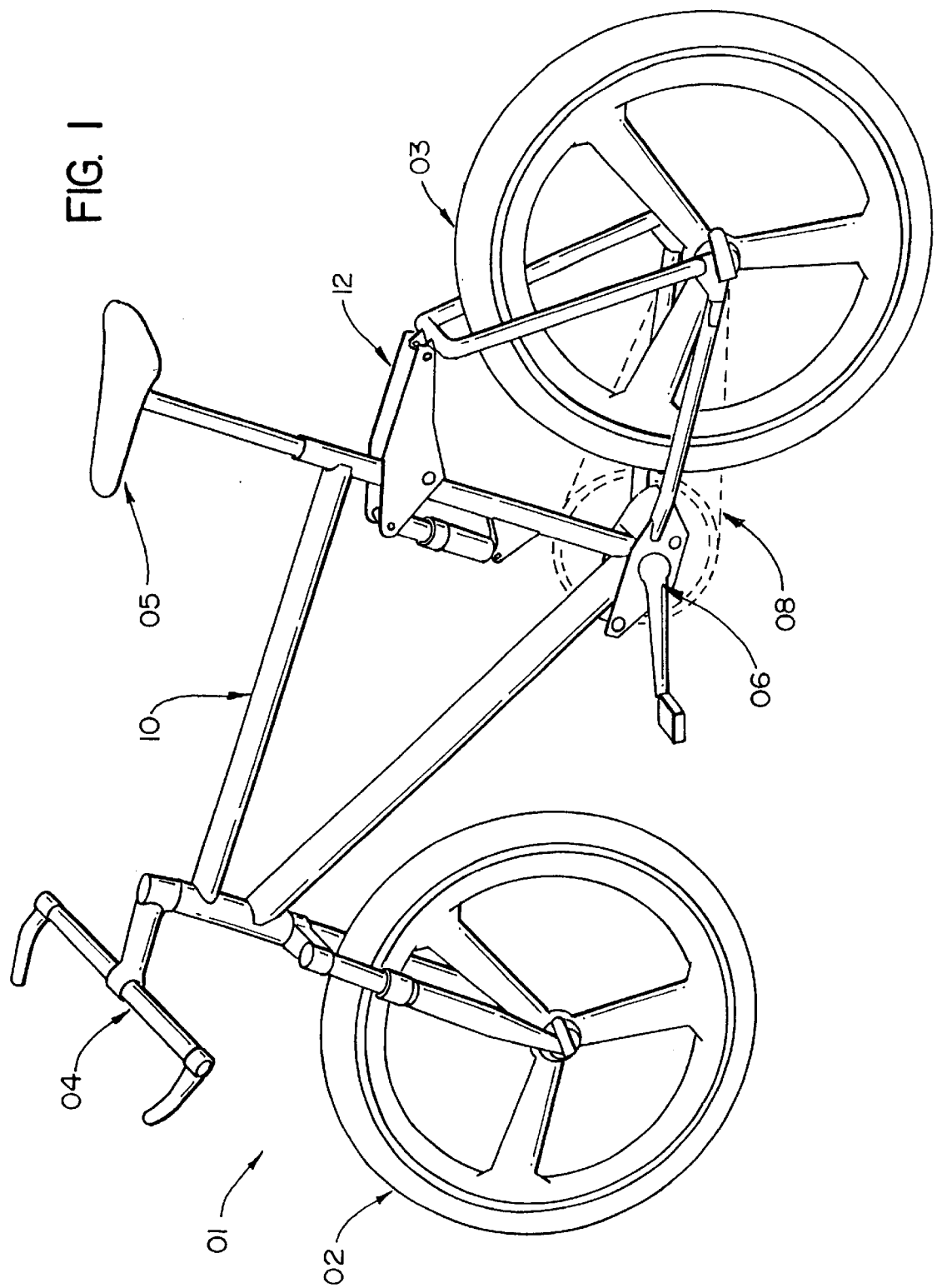
FIG. 1 is a perspective view of a bicycle having a rear suspension system constructed in accordance with the present invention.

FIG. 1 is a perspective view of a bicycle 01 having a frame 10 which incorporates a rear suspension system 12 in accordance with the present invention. The frame and suspension system have attachment fittings for the following components, which are of generally conventional configuration and therefore do not themselves form a part of the present invention: Front and rear wheels 02, 03, handle bar assembly 04, seat assembly 05, crank set 06, chain drive/deraileur system 08.

Figure 2:
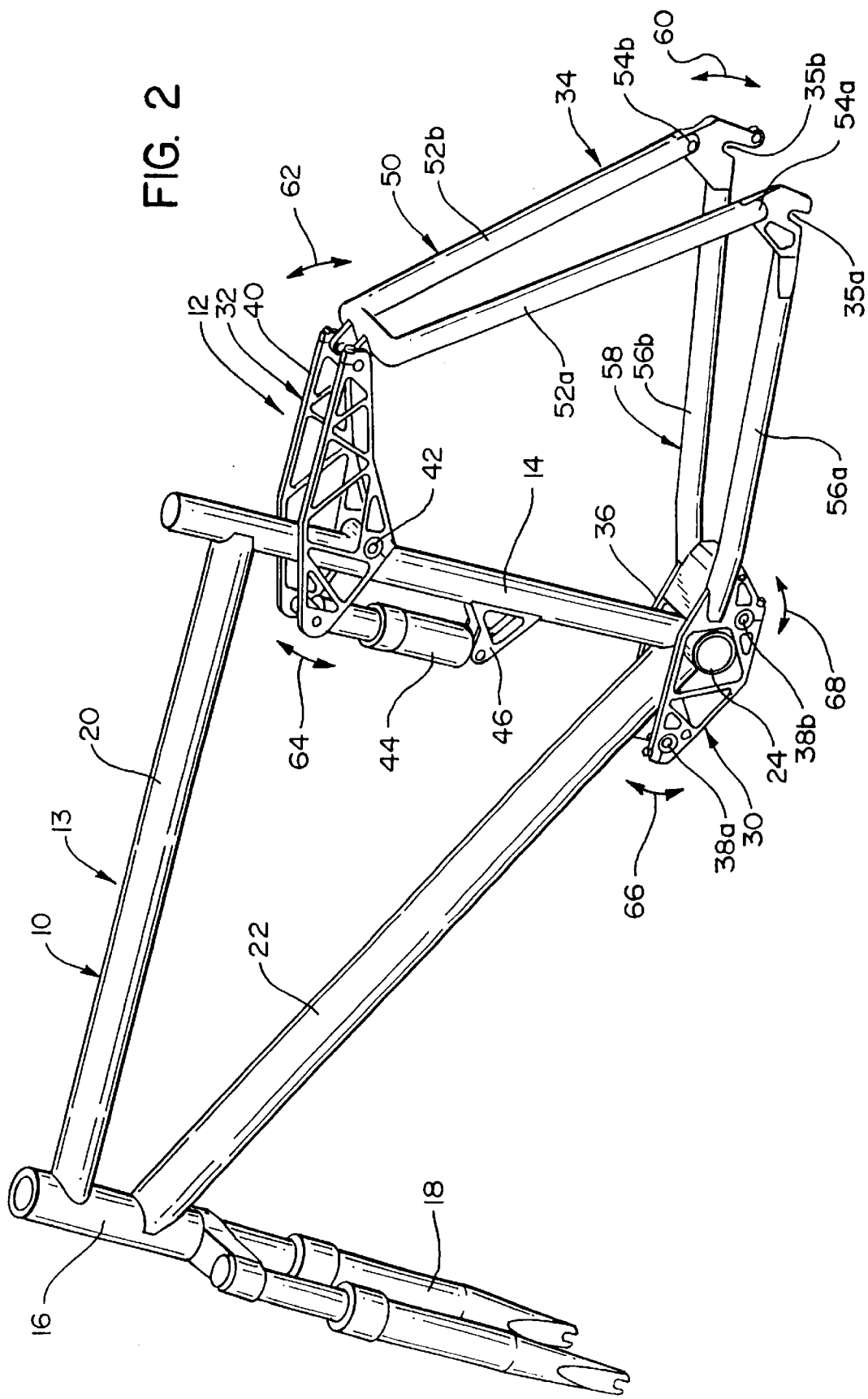
FIG. 2 is a perspective view of the frame and rear suspension of the bicycle of FIG. 1, showing these in enlarged detail.

FIG. 2 shows the bicycle frame 10 and rear suspension system 12 in enlarged detail. As can be seen, the example frame which is shown in FIG. 2 is generally similar to a traditional "diamond" frame in overall configuration: The forward frame section 13 comprises a generally vertical seat tube 14 for supporting the rider's mass, while a shorter, generally parallel head tube 16 supports the front fork assembly 18 and handle bars. The seat tube and the head tube are interconnected by a generally horizontal top tube 20 and a diagonally extending down tube 22, and at their lower ends the down tube 22 and the seat tube 14 are mounted to a cylindrical bottom bracket shell 23. The bottom bracket shell extends in a horizontal direction and receives a conventional crankset (i.e., pedals, crank arms, crankshaft, chain rings, and associated components) by which the drive tension is applied to the drive chain; as used in this description and the appended claims, the term drive "chain" includes not only bicycle chains but also drive belts, toothed belts, and similar power-transmission devices.

Although, as was noted above, the frame assembly which has thus far been described is generally conventional in configuration, and therefore has the advantage of being suitable for use with more-or-less standardized components such as saddles, handlebar stems, and so forth, it will be understood that the suspension system of the present invention may also be employed with bicycle frames which have configurations other than the generally conventional one which is shown herein.

The rear suspension system 12 of the present invention comprises three interconnected subassemblies: (1) a lower pivot assembly 30, (2) an upper pivot assembly 32, and (3) a rear swinging arm assembly 34, the rear wheel being mounted at the apex of the latter, in axle notches (dropouts) 35a, 35b.

As will be described in greater detail below, the lower pivot assembly 30 comprises a framework 36 which is pivotally mounted to the forward frame section by front and rear eccentric crank members 38a, 38b. The upper pivot assembly 32, in turn, comprises a rocker frame 40 which is pivotally mounted to the seat tube of the frame section by a spindle 42. The rocker frame 40 extends both forwardly of and behind the seat tube 14, and at its forward end is pivotally mounted to the upper end of a spring/shock absorber 44, the lower end of the shock absorber being pivotally mounted to a bracket 46 in the seat tube. The rearward end of the rocker frame is attached at pivot pins 48a, 48b to the upper end of the upper control arm member 50 of the swinging arm assembly. The control arm member is bifurcated so as to form first and second rearwardly extending legs 52a, 52b which correspond somewhat to conventional seat stays in general orientation. At their lower ends, the two leg portions 52a, 52b are attached at pivot points 54a, 54b to the rearward ends of the two leg portions 56a, 56b of the lower arm member 58, the forward ends of which are fixedly mounted to the framework of lower pivot assembly 30.

The actual wheel travel path which is provided by the system of the present invention is relatively complex, and will be described in detail below. However, the general direction of the suspension motions will be summarized here for the purposes of this overview. As the bicycle is ridden over rough terrain, impact loading which is received at the rear wheel causes the rearward end of the swinging arm assembly 34 to move up and down and along a curved path, as is indicated by arrow 60. Simultaneously, the joint between the arm member 50 and the rearward end of the upper pivot assembly 32 moves up and down and along an arcuate path, as indicated by arrow 62, causing the rocker frame of the upper pivot assembly to pivot around spindle 42. This in turn compresses and unloads the shock absorber 44, between the end of the upper pivot assembly 32 and fixed frame bracket 46.

Simultaneously with these motions, the framework of the lower pivot assembly 30 pivots about the bottom bracket shell on the eccentric crank members 38a, 38b, as indicated by arrows 66, 68. As will be described in greater detail below, this movement prescribes the curve which the wheel axle follows as the suspension is compressed, and this motion falls generally into three phases: during the first phase, the combined motion of the eccentrics is such that the effective pivot point of the assembly is near the rear eccentric member; during the second phase both eccentrics move together so as to add a rearward component to the motion of the assembly, the pivot point moving to a point above the bottom bracket; during the final phase, the pivot point moves toward the front eccentric member.

The result is that these combined motions provide a "virtual pivot point" which shifts so as to define a complex curve which is followed by the rear wheel as the suspension is compressed. As will be described in greater detail below, this allows the system to employ what is known as a "chainstay lengthening effect" (i.e., an effective increase in the distance between the bottom bracket shell 23 and the axle of the rear wheel at 35) at selected points in the compression cycle. In those phases where the chainstay lengthening effect increases, tension on the drive chain causes the suspension assembly to provide an upward force on the frame in response to the application of downward force on the pedals. Below the position (referred to herein as the "preferred pedaling position") to which the suspension is compressed by the mass of the rider resting on the seat tube, there is a lesser chainstay lengthening effect, with the result that there is a lesser or minimal effect of chain tension on the suspension below the preferred pedaling position so that it remains compliant to unpowered vertical inputs by the rider (i.e., rider weight) and to bump forces caused by the terrain. The net effect of this is that the system is able to "isolate" pedal inputs from terrain inputs, i.e., the suspension will not compress/extend due to pedal forces which are exerted by the rider, but will remain compliant to irregularities of the terrain.

Having provided an overview of the system of the present invention, each of the subassemblies will now be described in greater detail, and this will be followed by a description of the motion which these elements cooperate to provide.

b. Subassemblies i. Lower Pivot Assembly

Figure 3:
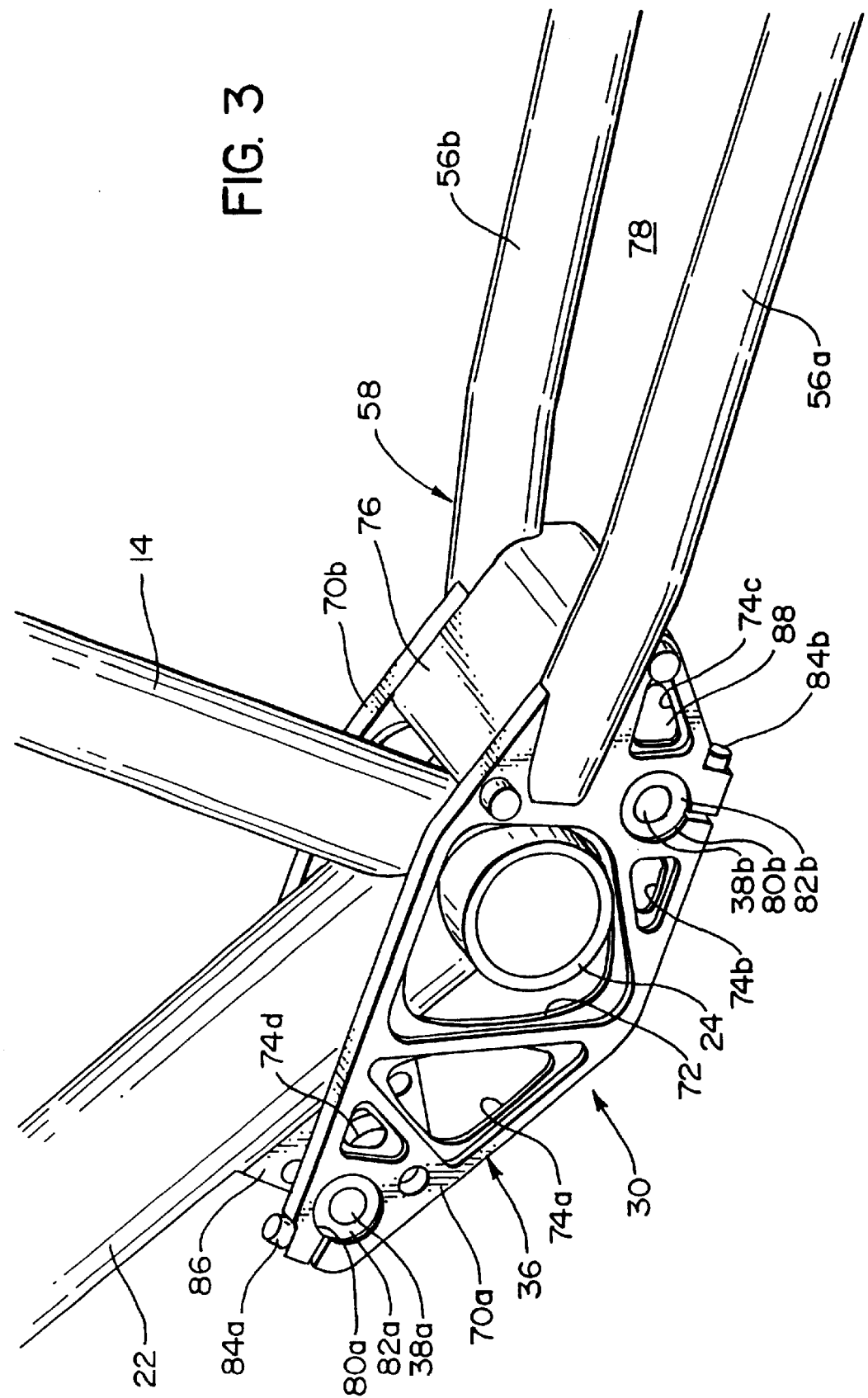
FIG. 3 is an enlarged perspective view of that portion of the rear suspension system which is mounted adjacent the bottom bracket shell of the frame.

FIG. 3 provides an enlarged view of the lower pivot assembly 30. As can be seen, this comprises two, essentially identical planar side plate members 70a, 70b which may be machined, cast or forged, as desired. Each plate member is provided with generally central opening 72 which is sized to receive the bottom bracket shell 23 and to accommodate the range of motion which the dual eccentric mechanism provides relative to the frame. The plate members are also preferably formed with several relief openings or cutouts 74a–74d for the purpose of minimizing weight; these cutouts may have any suitable size and shape, the generally triangular openings with radiused internal webbing which are shown in FIG. 3 having been selected as being structurally superior, but also as providing a distinctive and aesthetically pleasing appearance.

The rearward ends of the two side plate members 70a, 70b are fixedly mounted to the forward end of the lower control arm member 58, which is provided with a mounting block 76 which fits between the side plate members. The two leg portions 56a, 56b of the lower arm member extend rearwardly from this, more or less parallel to the side plate members, so as to form an open area 78 which accommodates the rear wheel.

Circular openings 80a, 80b are provided proximate the forward and rearward ends of each side plate member 70 to receive the ends of the eccentric crank members 38a, 38b and their associated bearings 82a, 82b; in the embodiment which is illustrated, the ends of the eccentric crank members and the bearings are retained in the framework by pinch bolts 84a, 84b. The main spindles of the eccentric crank members are supported for pivoting motion in forward and rear frame lugs 86, 88 (see also FIG. 7B) and bearings 89a, 89b, these being mounted respectively to the down tube 22 and seat tube 14. The specific relationship and orientation of the eccentric crank members will be described in greater detail below, however, it may be observed from FIG. 3 that the mounting point for the front crank member 38a is positioned forwardly and somewhat above the cylindrical axis of the bottom bracket shell 23, while the rear eccentric crank member is positioned somewhat behind and below this. The spaced apart axes of all three (i.e., the bottom bracket shell and the two eccentric crank members) thus extend generally parallel to one another.

ii. Upper Pivot Assembly

Figure 4:
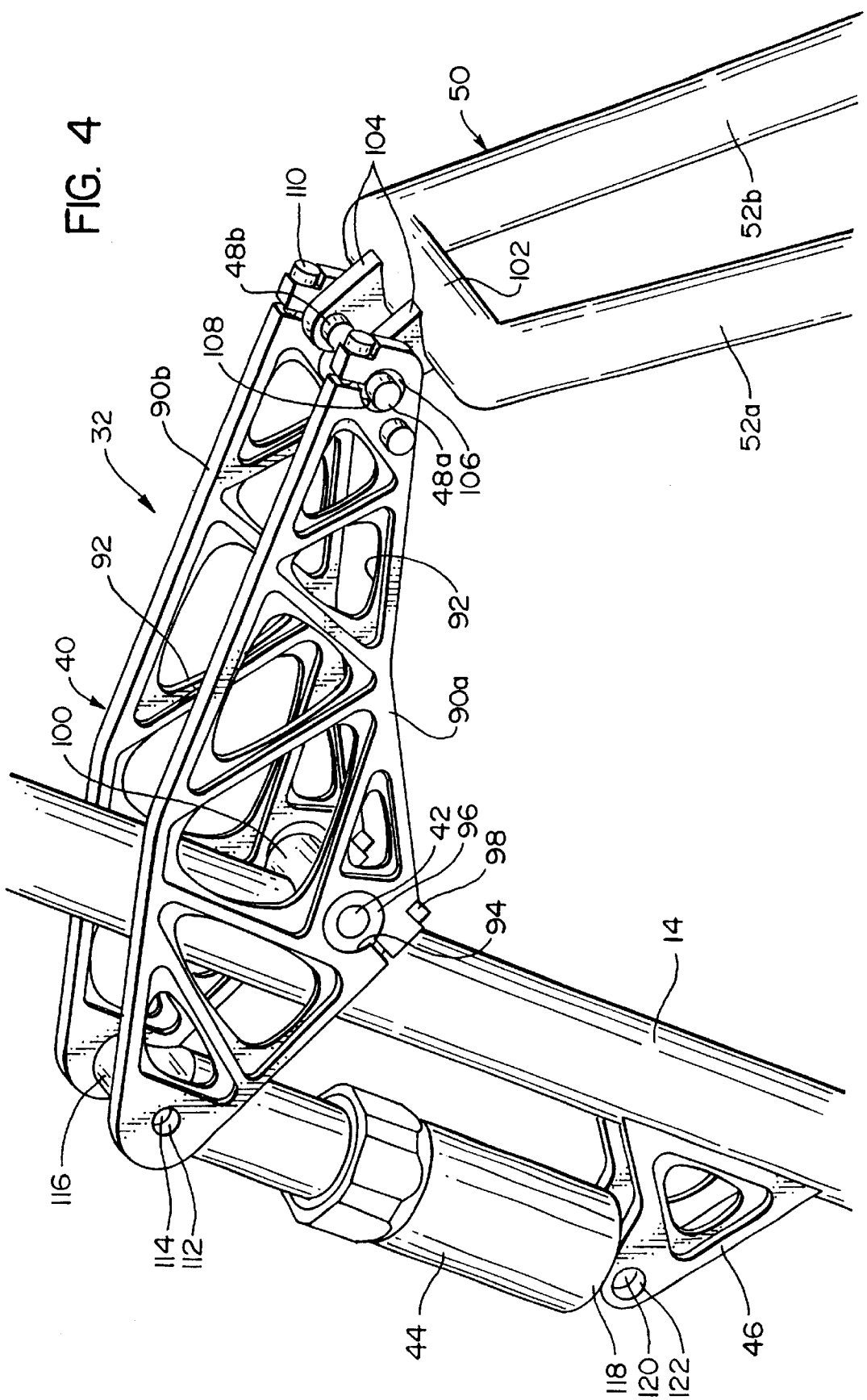
FIG. 4 is an enlarged perspective view of that portion of the suspension system which mounts adjacent the upper end of the seat tube of the frame, and which incorporates the shock absorber/spring of the system.

FIG. 4 shows the upper pivot assembly 32 in enlarged detail. As can be seen, this somewhat resembles the lower pivot assembly in that the framework 30 is made up of first and second side plate members 90a, 90b which are arranged parallel to one another and extend in the direction of the longitudinal axis of the bicycle. As with the bottom pivot assembly, the plate members 90a, 90b are provided with a series of cutouts 92 to reduce weight.

In a middle portion of the framework, the side plate members are provided with openings 94 which accommodate the axle or spindle 42 and its associated bearing 96, these being retained in the plate members by pinch bolts 98. The spindle 42 extends through a cooperating bore in a frame lug 100 on the seat tube. However, unlike the eccentrics of the lower pivot assembly, spindle 42 is a straight axis member which provides a single axis of rotation.

The rearward end of framework 40 is pivotally mounted to the upper end of upper control arm member 50. In the embodiment which is illustrated, the upper ends of the two leg portions 52a, 52b are joined by a crossbar 102, from which first and second plates 104 extend into the gap between the two side plate members 90a, 90b. The extension plates 104 are provided with cooperating bores (not shown) for the inner ends of the two pivot pins 48a, 48b, the outer ends of the pins and their associated bearings 106 being retained in openings 108 by pinch bolts 110.

At the forward end of the framework, the two side plate members 90a, 90b are provided with bores 112 which receive a pivot pin 114 which extends through a bore (not shown) formed in the end 116 of the shock absorber. The lower end 118 of the shock absorber is mounted to the frame tube by a second pivot pin 120 which extends through a bore 122 formed in the protruding end of frame bracket 46.

Spindle 42 and the pivot pins 48, 114, and 120 are arranged so that their axes all lie parallel to one another.

Shock absorber 44 is preferably of a conventional type, such as a Fox™ or Risse™ bicycle rear spring and damper unit. Other shock absorbing mechanisms having suitable spring and damping characteristics may be substituted for the exemplary type which has been described above.

iii. Swinging Arm Assembly

FIG. 5 shows the rearward end of the swinging arm assembly 34 in enlarged detail. The apex of the assembly is provided by left and right axle brackets 130a, 130b, which are somewhat similar in overall configuration to conventional rear axle dropouts and have slots/notches 35a, 35b in which the axle is received. The right axle mount bracket 130b may also be provided with a deraileur mounting lug 132.

The forwardly extending tang portions 134a, 134b of the axle mount brackets (dropouts) are received in and fixedly mounted to the leg portions 56a, 56b of lower arm member 58. The upper corners 136a, 136b, in turn, are received in the forked lower ends 138a, 138b of the legs 52a, 52b of upper arm member 50, and are mounted thereto by pivot pins 140a (not shown) and 140b. The pivot axis provided by pins 140a, 140b lies parallel to those of the other pivot points in the system.

c. Operation i. Chainstay Lengthening Effect

In a suspension system which causes the chainstay length to increase when the wheel is moved vertically, a downward force will develop on the wheel when the chain is tensioned, i.e., by the powered inputs at the pedals, this being referred to as a "chainstay lengthening effect". The greater the increase in chainstay length for a given vertical wheel displacement, i.e., the greater the rate of chainstay lengthening, the greater the downward force on the wheel when the chain is tensioned. Chainstay lengthening which develops indiscriminately throughout the range of suspension travel (as is the case with many prior suspensions), is undesirable because it causes the bicycle to "back-pedal" when the wheel is moved vertically by the terrain; also, such systems require an excessively long chain and rear deraileur so that there will be enough slack to make up for the change in distance with no chain tensioning at all, on the other hand, it is not possible to provide any upward force on the frame to oppose the downward pedaling force of the rider. However, by providing the controlled path for movement of the rear wheel which is described herein, the present invention is uniquely able to apply varying degrees of "chain lengthening effect" are provided only where these are necessary to balance out the forces which are applied by the rider.

The basic forces which are applied to the suspension are as follows: (1) Mass of the rider, or "un-powered" input (vertically downward force on seat and/or bottom bracket center axis); (2) Pedal force applied by the rider, or "powered input" (vertically downward force and/or turning moment about bottom bracket spindle axis which applies a forward force to the rear wheel as a result of chain tension); (3) Combined force of spring and damper (upward on frame and downward on rear wheel center axis); and (4) Vertical terrain input (slightly backward and/or upward on rear wheel center axis). The present invention selectively applies the chainstay lengthening effect to balance the first three of these forces, so that they can be isolated from the fourth; this has been achieved by determining which segments of the wheel travel path correspond with the greatest compressive force on the suspension from pedal inputs, and configuring the wheel path so that the counteracting chainstay lengthening effect occurs only at those points where it is needed.

The first segment of the path is that which is traversed as the mass of the rider causes the suspension to compress or "sag", bringing the wheel to the optimum position for pedaling, this being referred to herein as the "preferred pedaling position". The wheel travel path of the present invention is configured to apply an increase in chainstay lengthening at this point (i.e., at about the preferred peadling position), so that the downward force on the frame is opposed by a downward force on the wheel as a result of chain tension; directly above the preferred pedaling position is where the greatest degree of chainstay lengthening is applied in most embodiments, to oppose vigorous downward pedal inputs which would otherwise cause the suspension to compress.

As the wheel moves over the next segment of the path, above the preferred pedaling position, the increasing resistance of the suspension spring unit (e.g., the shock absorber) assists the chainstay lengthening effect in opposing rider pedal inputs. For this reason, progressively less chainstay lengthening is required as the wheel moves toward the top of its path, so that the final segment of the path is designed so that minimal chainstay lengthening effect occurs towards its top, where the opposing spring force is the greatest.

This wheel path can be contrasted with those which are provided by prior art systems. Low pivot suspensions, for example, in which the pivot point at or near the bottom bracket, employ very little chainstay lengthening and therefore allow undesirable movement of the suspension at wheel positions above the preferred pedaling position resulting in a loss of pedaling efficiency. High pivot designs, in turn, employ chainstay lengthening to oppose the vertical rider inputs, but cause too much lengthening, especially when used in long travel (e.g., over three inches) suspensions. Furthermore, high pivot systems tend to "over-control" the rear wheel under hard pedaling, forcing it toward the bottom of the suspension stroke when the wheel is below the preferred pedaling position. It might seem from this that a pivot point halfway between the high and low positions would result in optimized characteristics, but this is not feasible in practice because of the many variations in riding position and pedaling techniques (e.g., sitting or standing, "spinning" or "pounding", and so forth). The present invention achieves a more encompassing solution by employing a "shifting" pivot point which provides characteristics resembling those of to a low pivot system at the top and bottom of the wheel path, and resembling those of a high pivot system when the wheel is located directly above the preferred pedaling position where the greatest chainstay lengthening effect is needed.

ii. Dual Eccentric Linkage

Figure 7A:
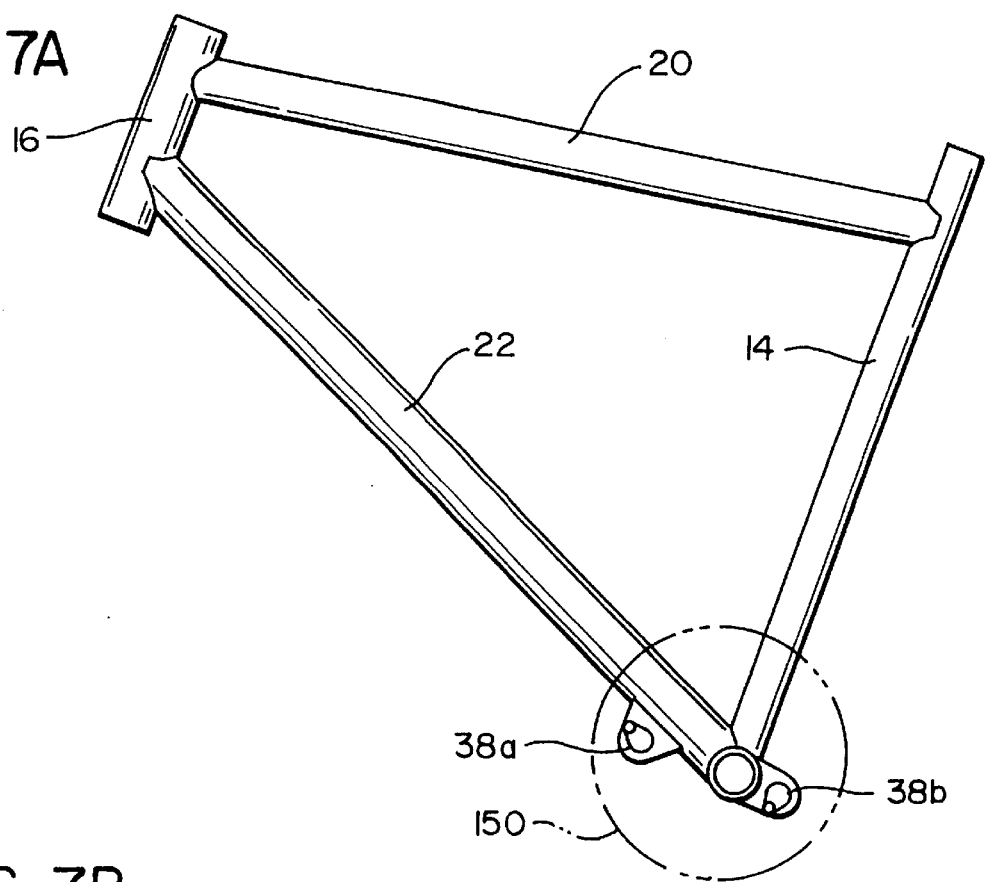
FIG. 7A is an elevational view of the frame of FIG. 2 showing the bottom pivot portion of the system partially disassembled to expose the eccentric crank arms which interconnect this portion of the assembly to the bicycle frame.
Figure 7B:
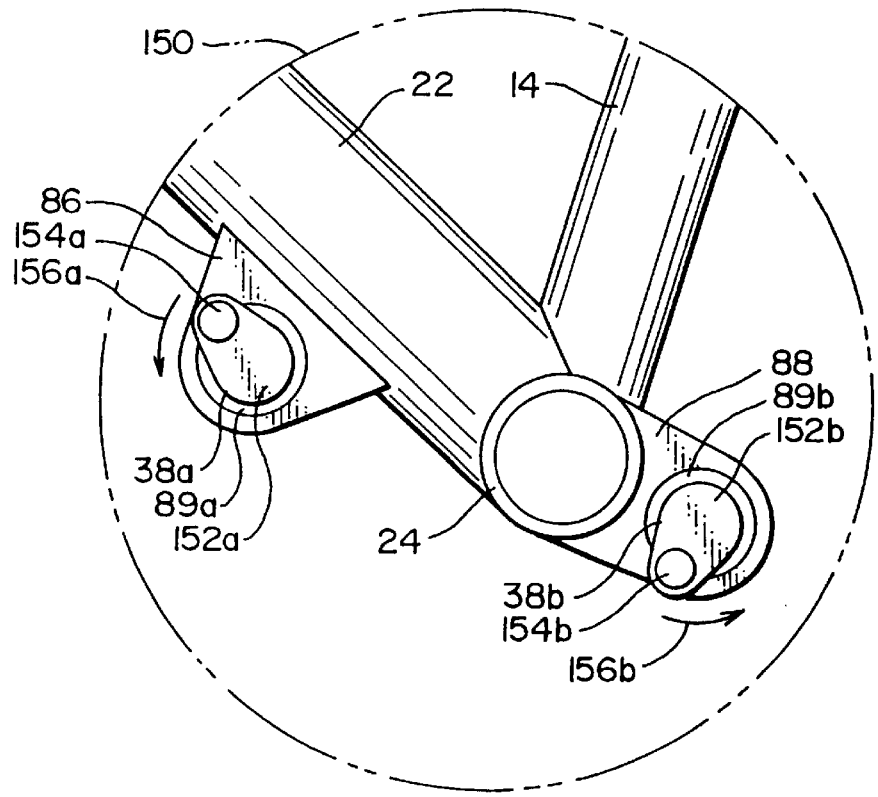
FIG. 7B is an enlarged-view of the bottom pivot portion of the rear suspension assembly which is shown in FIG. 7A.

The dual eccentric linkage which defines the wheel travel path of the present invention makes up part of the bottom pivot assembly 30. This assembly and the general orientation of the forward and rear eccentrics 38*a*, 38*b* can be seen in FIG. 6, while FIGS. 7A–7B show the assembly with the crank members exposed. As can be seen in the enlarged area 150, the eccentrics 38*a*, 38*b* (the right side of the assembly being mirror-image identical to the side which is shown) comprise spindle portions 152*a*, 152*b* which are supported for rotation about their primary axes in frame brackets 86, 88 and bearings 89*a*, 89*b*, and offset lobe portions 154*a*, 154*b* which are received in the corresponding openings 80*a*, 80*b* of the framework (see FIG. 6).

Thus, as the suspension is compressed, the spindle portions rotate within the frame section, and the offset lobe portions 154 swing through arcuate paths, as indicated by arrows 156*a*, 156*b*. In the exemplary embodiment which is illustrated, the spacings between the primary and secondary axes is approximately 7 inches, with the range of possible spacings being from about 1" or less to about 23".

FIG. 7B also shows the orientation of the two crank members when the suspension is in its initial, uncompressed condition; in particular, in this condition the forward eccentric crank member 38*a* is aligned in an upward and forward direction, so that its lobe portion is at about 90° from top dead center, while the rear eccentric crank member 38*b* is aligned so that its lobe portion extends approximately 165° degrees from top dead center.

iii. Interaction of the Eccentric Crank Members During the Phases of Wheel Travel In the schematic views of FIGS. 8A–8C, the forward eccentric is represented by front link 160*a*, and the rear eccentric is represented by back link 160*b*. The arcs of rotation of the links for each phase of the compression cycle are indicated by the associated arrows.

Figure 8A:
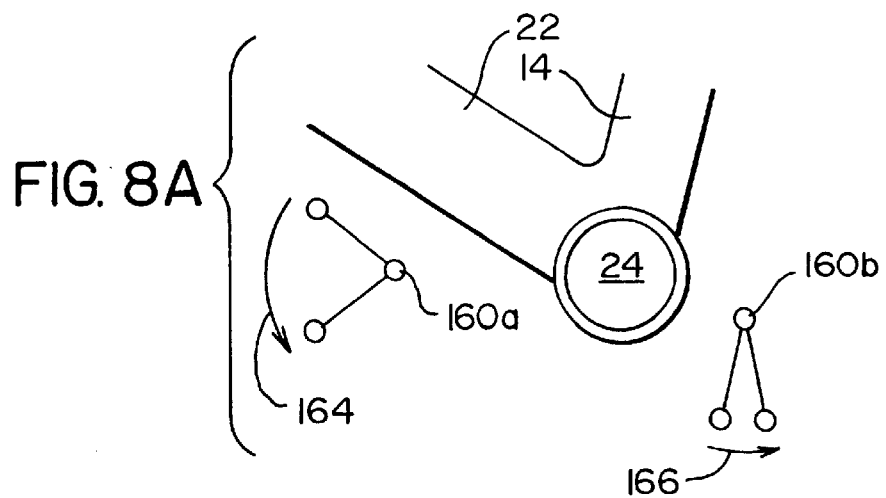
FIGS. 8A–8C are sequential, diagrammatical views illustrating the manner in which the motions of the two eccentric crank arms cooperate as the suspension is compressed to provide a prescribed path for the motion of the rear wheel.

FIG. 8A shows the movement for the first (bottom) third of wheel travel. Since there is an approximate 90° difference in angular orientation between the two eccentrics in the unloaded condition, the first third of wheel movement causes more rotation of the front link 160*a* (as indicated by arrow 164) than at the rear link 160*b* (arrow 166). This gives this segment of the wheel travel path a focus point (referred to as focus point "A") which is located near the back link 160. Since the back link is mounted near the bottom bracket, this results in minimal chainstay lengthening, chainstay lengthening not being desired during this phase because the suspension is simply "sagging" down to the preferred pedaling position under the rider's weight.

Figure 8B:
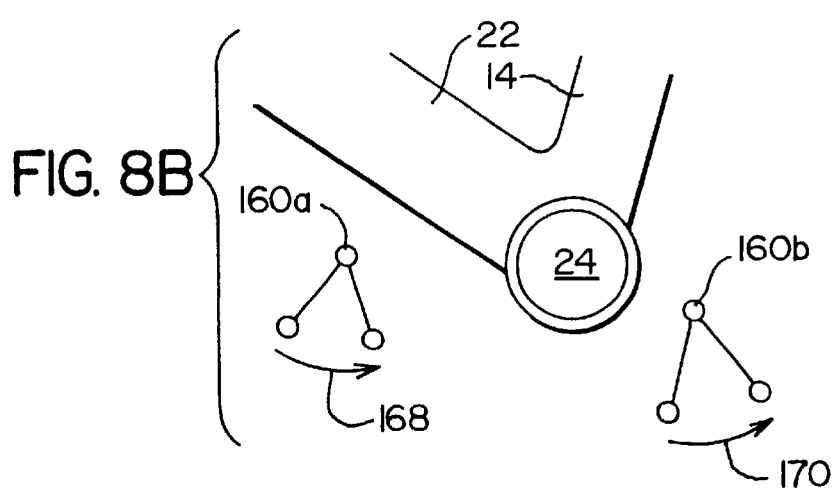

FIG. 8B shows the linkage operation during the middle third of wheel travel. This phase begins at or near the preferred pedaling position, so that this is the point at which the suspension needs the greatest resistance to compression by the powered inputs. As can be seen in FIG. 8B, at the beginning of this phase the two links no longer extend at right angles to one another, but have moved to a roughly parallel alignment. As a result, both links rotate a similar amount during this phase, as indicated by arrows 168, 170, and their combined motion causes movement of the rear stay in a more generally rearward direction. This results in a shift of the "virtual pivot point" to a location significantly above the bottom bracket (to focus "B") and results in an enhanced chainstay lengthening effect, so that tension which is applied to the chain by the pedal inputs causes a downward force on the wheel which counterbalances the forces which are exerted on the frame through the bottom bracket. In practice, this arrangement has been found to be so effective that the rider can apply extremely irregular pedal inputs or even jump on the forwardmost pedal without causing significant compression of the suspension beyond the preferred pedaling position.

Figure 8C:
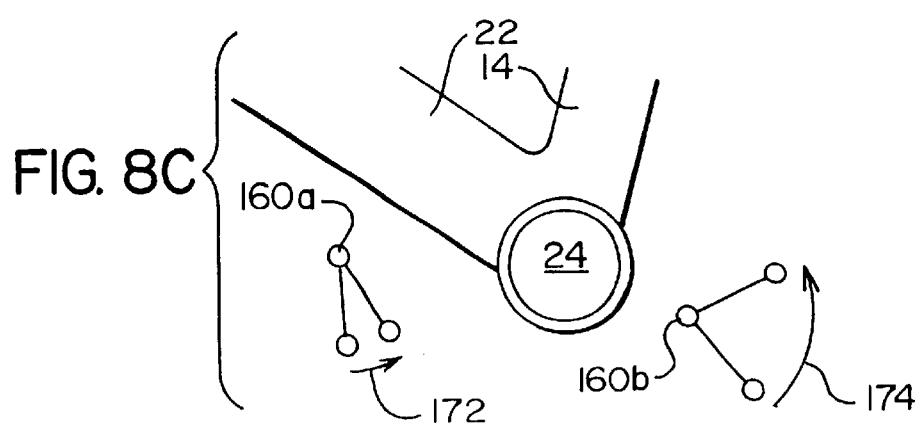

The final phase of motion is shown in FIG. 8C, during which the suspension moves towards its fully compressed condition. At the beginning of this phase, at which the wheel is located significantly above the preferred pedaling position, the links 160a, 160b have moved back to an orientation which is roughly at right angles (90°) to each other, with the result that movement of the back link becomes greater relative to movement of the front link, as indicated by arrows 174 and 172. This shifts the focus of the wheel movement (referred to herein as focus "C") and moves the pivot point closer to the front link 160a, reducing the chainstay lengthening effect. The downward force which the chain tension produces on the wheel therefore tapers off during this phase, although the force which is exerted by the spring simultaneously increases to oppose rider powered inputs.

Figure 9:
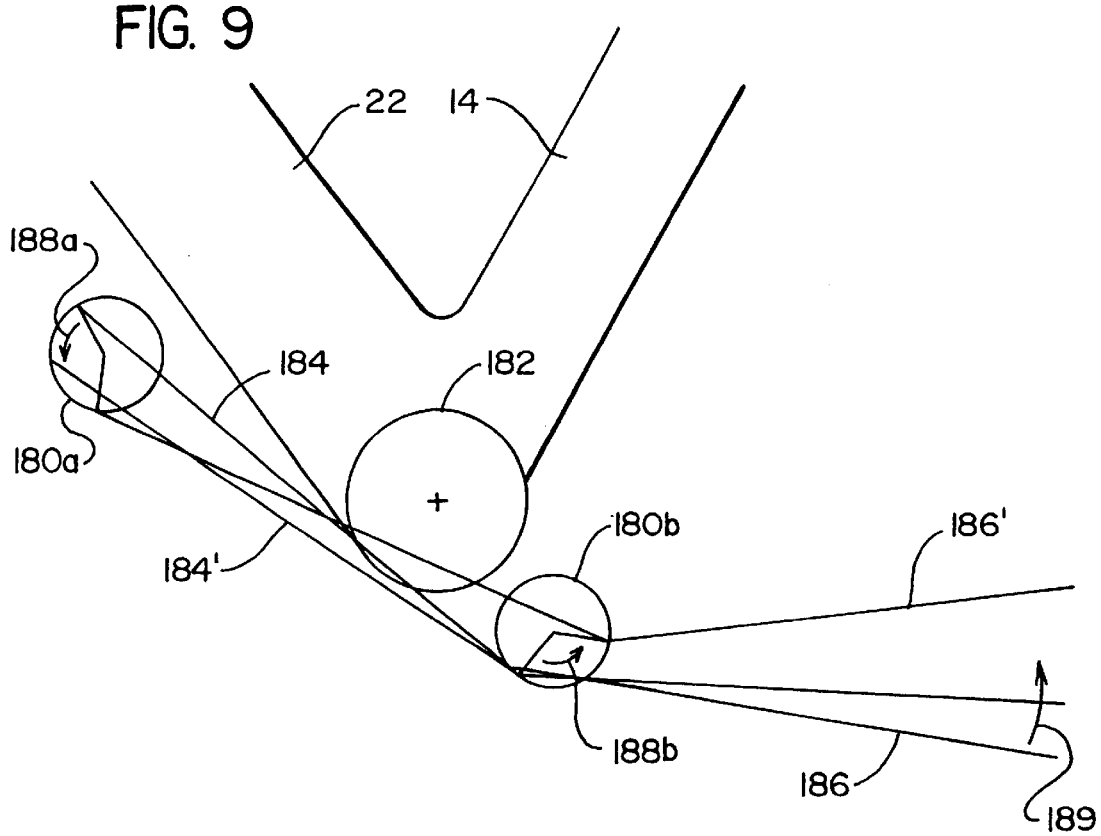
FIG. 9 is a diagrammatical view of the bottom pivot assembly of the suspension system, illustrating the alignment of the components at the beginning and end points of the compression cycle.
Figure 10:
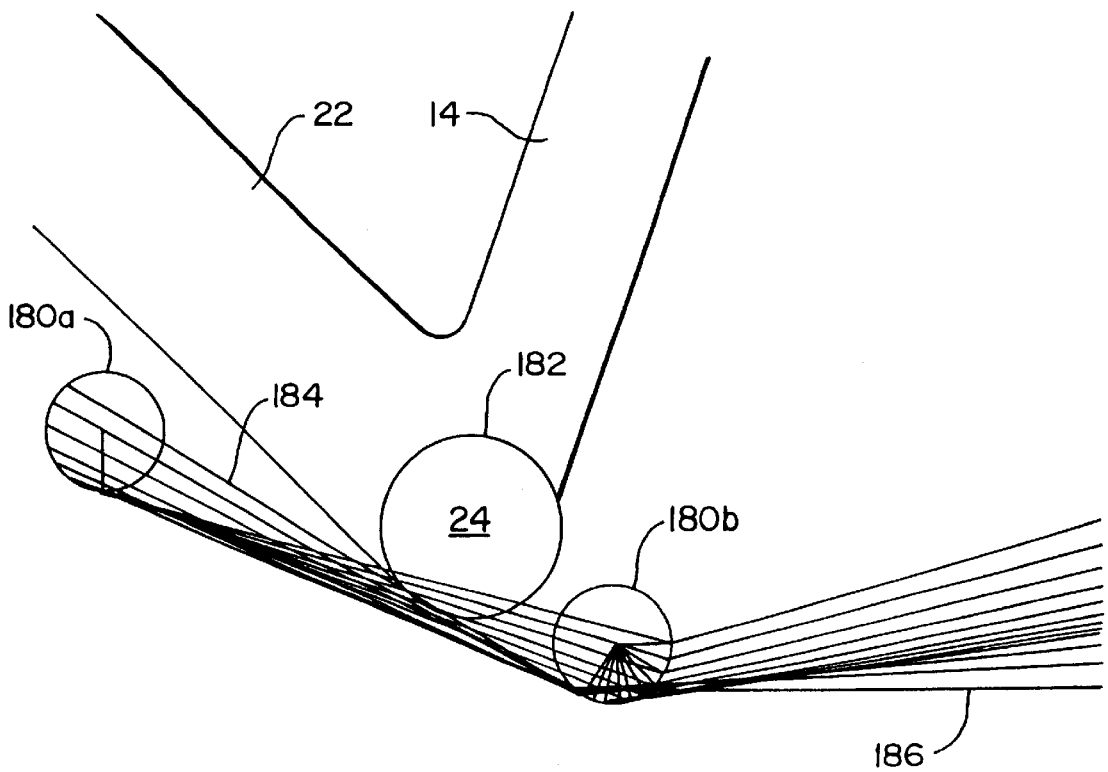
FIG. 10 is a view similar to FIG. 9, showing the alignments at sequential, 10° increments.
Figure 11:
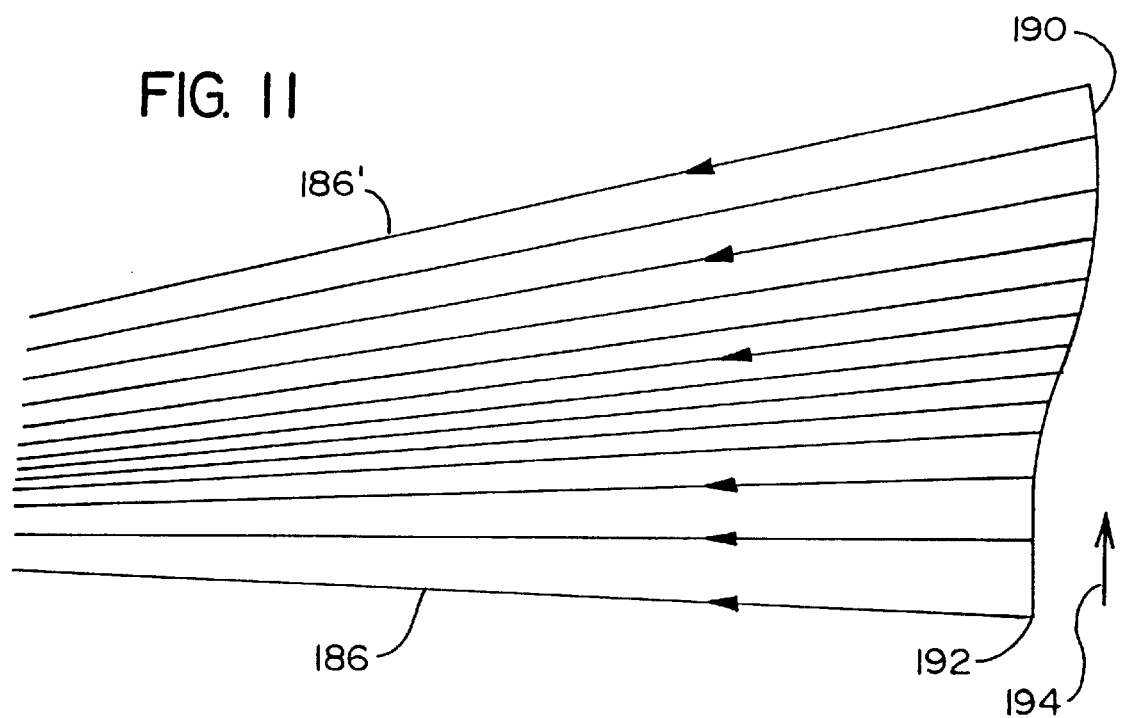
FIG. 11 is a view similar to FIG. 10, but showing the rearward end of the assembly and the manner in which the changes in alignment between the components produces the prescribed wheel travel path.

FIGS. 9–11 further demonstrate the manner in which the movements of the linkage described above serve to control and define the wheel path. In particular, FIG. 9 illustrates the relationship between the eccentric crank members at the beginning and end of the compression cycle. The links 160a, 160b are indicated schematically by circles 180a, 180b, the primary axes (i.e., the axes of the spindle portions of the eccentrics) being indicated at the centers of the circles, while the secondary axes (i.e., those of the eccentric lobe portions) are indicated by points on the perimeters thereof. The axis of the bottom bracket assembly is indicated at the center of circle 182, which corresponds to the bottom bracket shell 23. Thus, the distance between the lobe portions of the two eccentric members is represented by a first line segment 184 of fixed length, while the distance from the rear eccentric to the axis of the rear wheel defines a second line segment 186.

With further reference to FIG. 9, it can be seen that as the suspension compresses, the forward and rearward links rotate as indicated by arrows 188, with the result that the rear axle is moved rearwardly and upwardly in the direction of arrow 189; as this is done, the rear wheel axle (at the end of 186–186') follows the path described above.

FIG. 10 is similar to FIG. 9, except that it shows the sequential positions (at roughly 10° intervals) of the two line segments throughout the compression cycle. FIG. 11, in turn, shows the path 190 which is followed by the wheel axle at the rearward end of the fixed length line segment 186–186', the general upward direction of the motion of the axle being indicated by arrow 194.

d. Description of Wheel Travel Curve
  i. Basic Configuration

Figure 12:
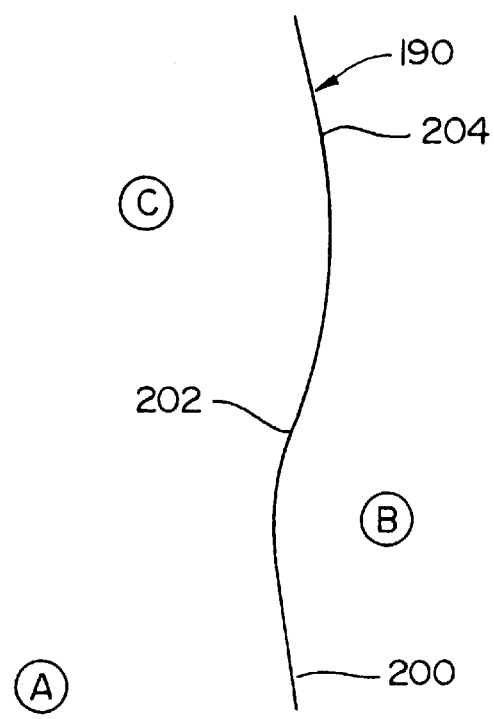
FIG. 12 is a graphical view illustrating the segments of the path which are followed by the rear wheel hub during compression of the suspension system.

FIG. 12 shows the example compound curve 190 in enlarged detail, and serves to illustrate the relative shift in position between the three foci "A", "B", and "C" during the three distinct phases of suspension travel which have been noted above. Focus "A" of the bottom portion 20 of the wheel travel may be on the forward (i.e., chain tensioning) side of the compound path 190. Then, during approximately the middle third portion 202 of the path, the focus "B" of the compound curve shifts to behind the wheel travel path, away from the chain tensioning side. Finally, during the top portion 204 of the wheel travel path, the focus "C" again shifts forwardly to the chain tensioning side of the curve. For the reasons discussed above, this compound curve produces a varying chainstay lengthening effect which serves to balance out the rider's pedal inputs. Although the curved portions of the wheel path are not simple arcs, each can be considered as having an averaged radius, with a smaller radius producing a tighter curve and vice-versa. Thus, it can be seen that the middle portion of the path (Focus "B") has a smaller averaged radius which may be similar to or smaller than the other two portions (Foci "A" and "C") This yields a fairly abrupt transition to the chainstay lengthening phase immediately above the preferred pedaling position, precisely where it is most needed to counteract the pedal inputs.

It is also important to note that the primary desirable characteristics of the suspension are provided by the pronounced chainstay lengthening effect (focus "B") at the preferred pedaling position, followed by the "tapering off" of the chainstay lengthening effect in the next phase above this (focus "C"). The lower third of the defined wheel travel path (i.e., focus "A") may therefore be regarded as somewhat optional (and may consequently be deleted in some embodiments), in that the enhancements which it provides are incremental as compared to those which are provided by the next two segments of the path. Also, the radius of the lower portion of the S-shaped path may be selected to approximate infinity, with the result that this part of the path may be virtually straight.

The preferred pedaling position is preferably (although not necessarily in all embodiments) located proximate or slightly below the inflection point or zone between the upper two segments, so that there is an increase in the chainstay lengthening effect (i.e., an increase in the rate of chainstay lengthening) as the axle moves upwardly above the preferred pedaling position, and then a decrease in the chainstay lengthening effect (i.e., a decrease in the rate of increase) as the axle moves into the upper portion of the curve. In short, immediately above the preferred pedaling position, or "sag" position (at approximately 1 inch of wheel travel in the illustrated embodiment), the rate of chainstay lengthening increases significantly; then after a predetermined amount of rear wheel travel which has been optimized for the particular bicycle (e.g., 1–2 inches), the rate slows or decreases.

The slowing or reduction of the chainstay lengthening effect is most important for high-travel suspensions; as was noted above, the reason for this is that as the wheel moves toward the upper end of its travel the spring will be providing increasing resistance, and an excessive rate of chainstay lengthening in this area will cause undesirable pedal feedback and strain on the drive train. In the case of bicycles having relatively modest (e.g., approximately 3 inches or less) amounts of rear wheel travel, it may not be necessary to significantly reduce the chainstay lengthening effect at the upper end of the wheel travel path: Due to the limited amount of suspension travel, a relatively simple curve may suffice without developing excessive pedal kickback; for example, a wheel travel path which describes a simple concave arc (relative to the bottom bracket axis) may be suitable for a road bicycle where large amounts of suspension travel are not needed.

A degree of chainstay lengthening effect is also desirable below the preferred pedaling position. This is because when the rider stands up on the pedals, the weight transfers from the seat, which is almost directly above the rear wheel, to the bottom bracket, which is located well forward of the rear wheel. As a result, the load on the rear suspension decreases, so that the suspension decompresses slightly and tends to bring the wheel axis to a point which is below that of the preferred pedaling position. Accordingly, it is desirable to provide a wheel travel path in which the bottom portion of the curve extends downwardly and forwardly from the preferred pedaling position in a relatively straight line (or a shallowly concave curve), so that when the wheel drops as the rider stands up, the axis will still be at a point along the curve where an opposing force is generated in response to the pedal inputs.

For example, assume that the preferred pedaling position at a 1 inch sag point with the rider seated, then as the rider stands up and his weight shifts towards the front of the bicycle, with the result that the axis of the rear wheel shifts downwardly along the wheel travel path approximately ⅔ inch; with a forwardly sloping straight lines bottom part curve, the slope of the curve at the first point, i.e., when the rider is standing, is similar to that when the rider is sitting.

ii. Curve Variations

The exemplary "S-shaped" curve described above is highly advantageous for many applications, notably extreme off-road riding conditions. It will be understood, however, that the present invention may be embodied throughout a range of curves, and which may be particularly suited to other specific applications, such as road bicycles or bicycles for light-duty trail riding, for example.

As is illustrated by FIGS. 13A–13D, the present invention provides a range of wheel travel paths in which the chainstay lengthening effects described are applied to varying degrees. In particular, from right to left (i.e., from FIG. 13D to FIG. 13A), the curves illustrate wheel travel paths having increasingly pronounced applications of the chainstay lengthening effect towards the preferred pedaling position. The intermediate "S-shaped" path 190 which has been described above is shown in FIG. 13B. Also, for reference, curve 208 in each of the figures represents an arc of constant radius from the bottom bracket.

Figure 13A:
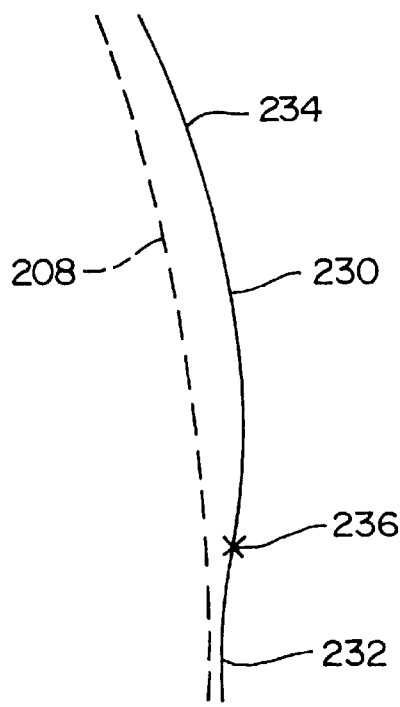
FIGS. 13A–13D are graphical representations similar to FIG. 12, showing a series of wheel travel curves which are provided by the present invention, and in which the chainstay lengthening effect is applied to a lesser or greater extent over the various segments of the paths.
Figure 13B:
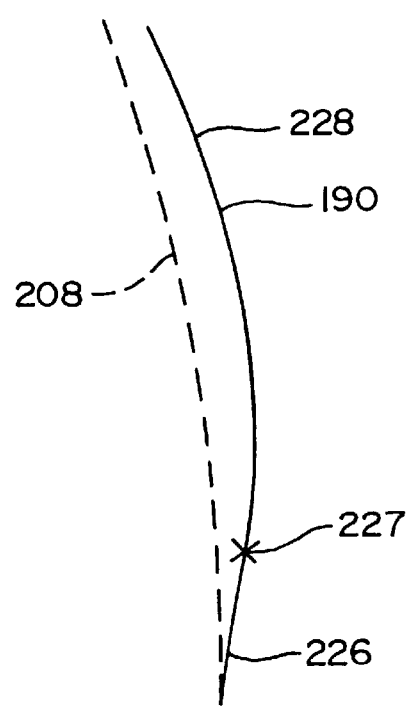
Figure 13C:
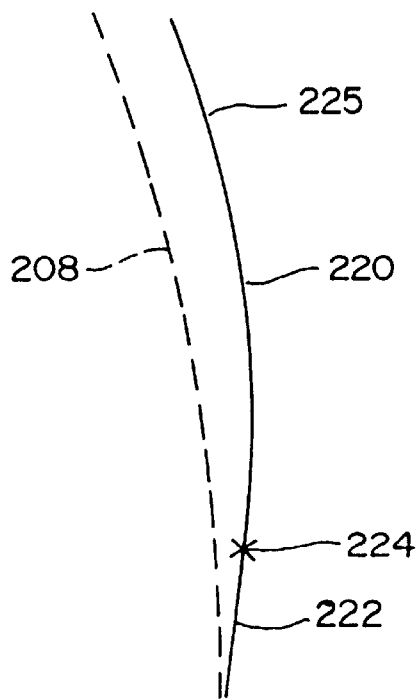
Figure 13D:
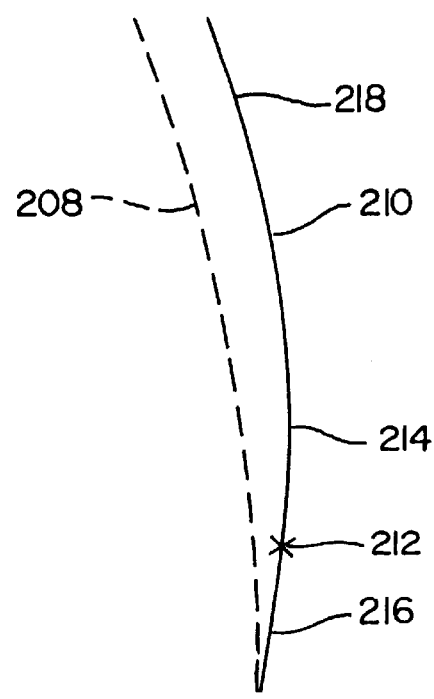

Accordingly, at the far right, FIG. 13D shows a first curve 210 which is perhaps best suited to use with systems having relatively limited suspension movement, such as (as will be described in greater detail below) systems in which relatively high friction bushings are employed with the eccentrics to assist in preventing suspension movement in conjunction with chain tension pedal forces. This curve comprises essential two arcs, with the bottom portion 216 having a significantly larger radius than the upper portion 218, i.e., the radius from the bottom bracket to the lower portion is greater than that from the bottom bracket to the upper portion. As a result, the large-radius lower portion 216, although forwardly curved, roughly approximates a forwardly-sloped straight line, giving the response described above.

FIG. 13C, in turn, shows a wheel travel curve 220, which differs from that of FIG. 14D in that the bottom portion 222 of the path is a substantially straight line slope below the inflection point 224. The effect is similar to that of curve 210, in that there continues to be an increase in the rate of chainstay lengthening toward the preferred pedaling position, although it is slightly more pronounced in the case of curve 220.

As was noted above, FIG. 13B represents the "S-shaped" curve 190 which has been described previously. As can be seen, the inverse curve bottom portion 226 of this path is somewhat convex about a fixed point which is rearward of the path. As a result, there is a relatively pronounced increase in the rate of chainstay lengthening moving upwardly toward the inflection point 227. This results in a strong opposing force being generated in response to pedal inputs in this range, tending to force or "center" the suspension back towards the preferred pedaling position. It will be noted, however, that the inverse portion of the curve does not start for some distance (e.g., about 1") below the preferred pedaling position, because in this range immediately below the preferred pedaling position it is desirable for the suspension remain relatively compliant to external bump forces. The upper portion 228 of curve 190, in turn, begins to bend forwardly and converge with the reference curve 208, representing a decreasing rate of increase in chainstay lengthening. As was noted above, this is important because beyond a certain point of compression (e.g., 1 inch above the preferred pedaling position), the opposing force which is generated by the pedal inputs should taper off as the downward force of the spring begins to take over.

Finally, FIG. 13A shows a more exaggerated "S-shaped" curve 230, in which the lower portion 232 is formed by a more pronounced inverse curve, while the upper portion 234 is substantially similar to that shown in FIG. 13B. As a result, the curve which is shown in FIG. 13A provides an even stronger, more pronounced tendency to "center" the suspension at the preferred pedaling position. For the reasons described above, the pronounced "S-shaped" curves which are shown in FIGS. 13A and 13B are best suited to bicycles where there is little or no shift in the center of gravity due to shifting in rider position, such as (in an extreme example) in recumbent-type bicycles where the rider remains seated at all times.

iii. Graphical Analysis

FIGS. 14A–14C, 15A–15C, and 16A–16C are a series of graphical plots corresponding to three of the exemplary wheel travel paths described above, further illustrating how the chainstay lengthening effect is applied at appropriate points in the suspension travel.

Figure 14A:
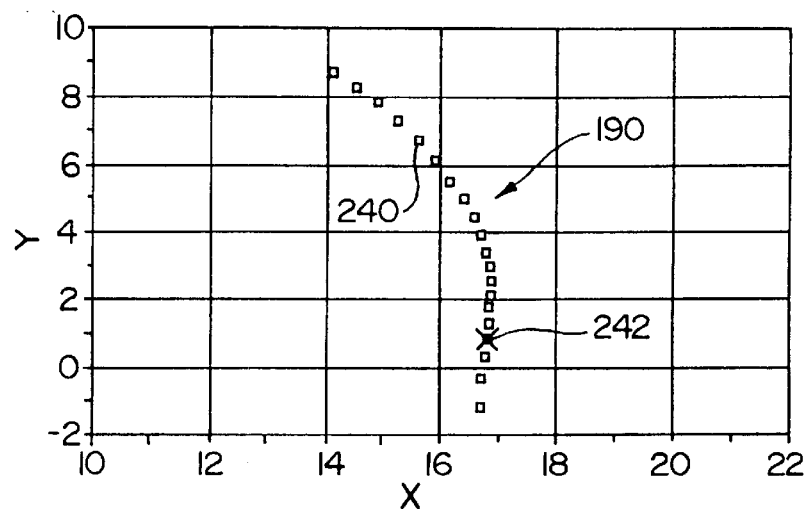
FIG. 14A is a graphical plot of chainstay length vs. vertical wheel displacement for the wheel travel path which is shown in FIG. 13A, this having a pronounced reverse curve below the point of inflection.

Specifically, plot 240 in FIG. 14A corresponds to the exaggerated "S"-shaped curve of FIG. 13A and shows the distance from the bottom bracket versus the vertical displacement of the hub. The plot in FIG. 14B, in turn, was produced by fitting a curve to the plot 240 of "CSL" (chainstay length) vs. the vertical movement of the wheel center ("Y"). From the fitted curve 244, the rate of change of CSL with respect to Y (the slope or derivative) was then calculated and plotted to produce the second curve 246, which represents the rate of increase of chainstay length at each point along curve 244.

Figure 14B:
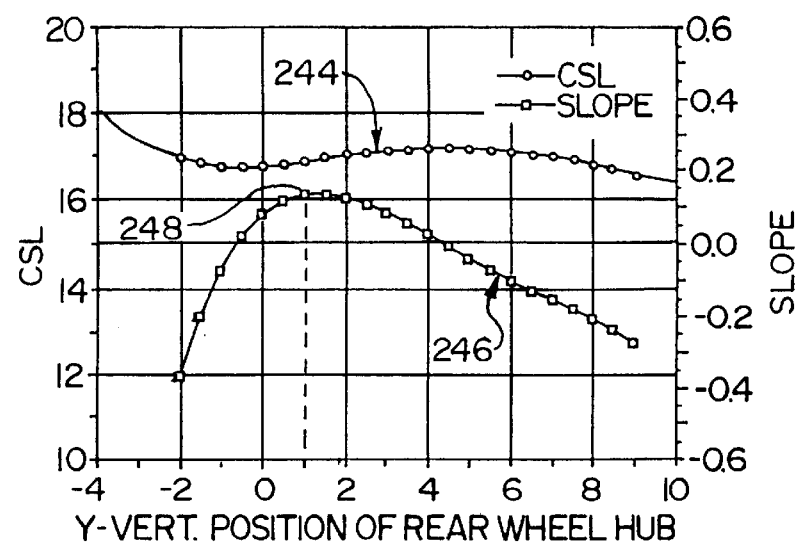
FIG. 14B is a graphical plot of two curves representing (i) chainstay lengthening and (ii) the slope of the chainstay lengthening curve, for the wheel travel path which is plotted in FIG. 14A, the latter representing the rate of chainstay lengthening at each point along the vertical displacement of the rear wheel hub.

As can be seen in FIG. 14B, the greatest slope, and hence the peak rate of increase in chainstay lengthening, occurs at approximately the 1 inch "sag" location 242 of the preferred pedaling position. In other words, the curve begins with a negative slope, which then increases above 0 and then decreases, so that there is a maximum chainstay lengthening effect proximate the preferred pedaling position.

Figure 14C:
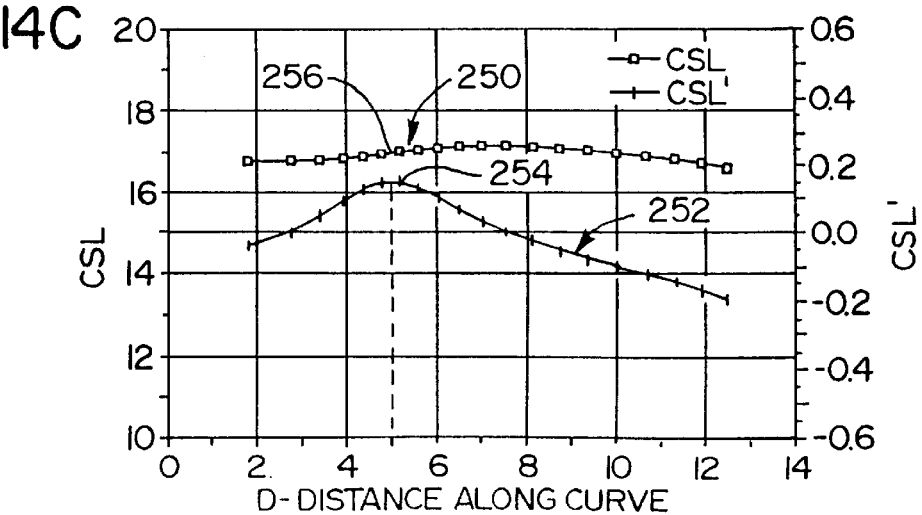
FIG. 14C is a graphical plot of two curves representing (i) chainstay lengthening and (ii) the rate of increase of chainstay lengthening, at increasing distances along the S-shaped curve which is shown in FIG. 14A, as opposed to vertical displacement of the wheel hub.

FIG. 14C is somewhat similar to FIG. 14B, but illustrates the corresponding curves which are produced when the controlling parameter is the distance "S" which is traveled along the curve/path by the hub, instead of the vertical displacement "Y" relative to the frame. As before, the derivative CSL', i.e., the slope of the curve 250, represents the rate of chainstay lengthening for each step of wheel travel: The CSL' vs. S plot is obtained by stepping along the curve 250 in increments and calculating CSL'=▲ (CSL)/▲D, where ▲CSL and ▲D are the small differences of CSL and D from one point to the next. (For smaller and smaller increments, this ratio approaches the derivative or slope of the function CSL.)

Figure 15A:
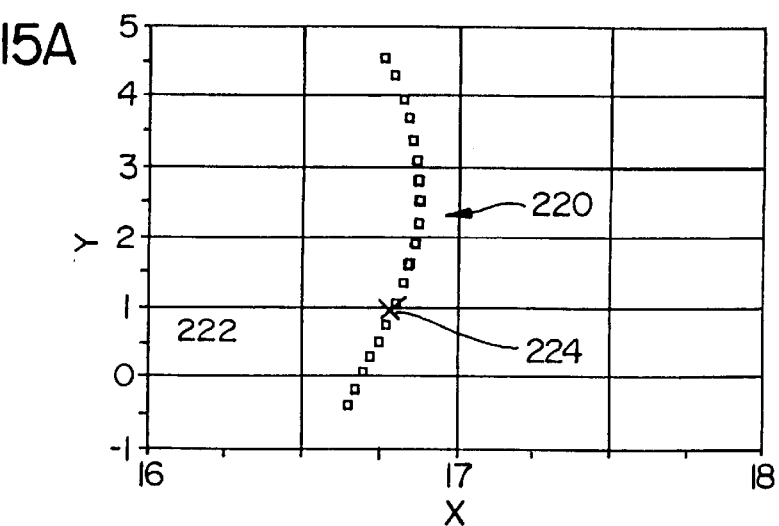
FIGS. 15A–15C are graphical plots of curves similar to those shown in FIGS. 14A–14C, but for the wheel travel path curve which is shown in FIG. 13C, in which the bottom portion of the curve is formed by a substantially straight line.
Figure 15B:
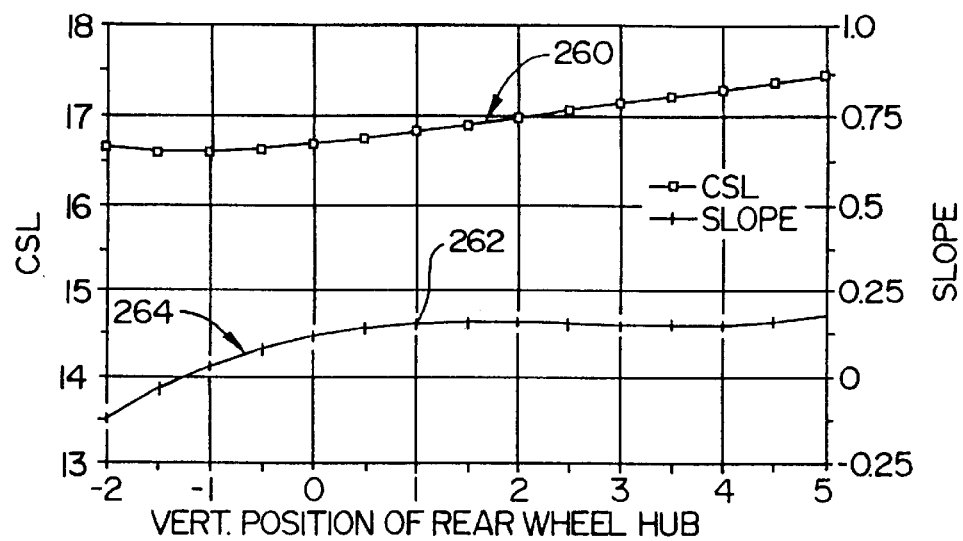
Figure 15C:
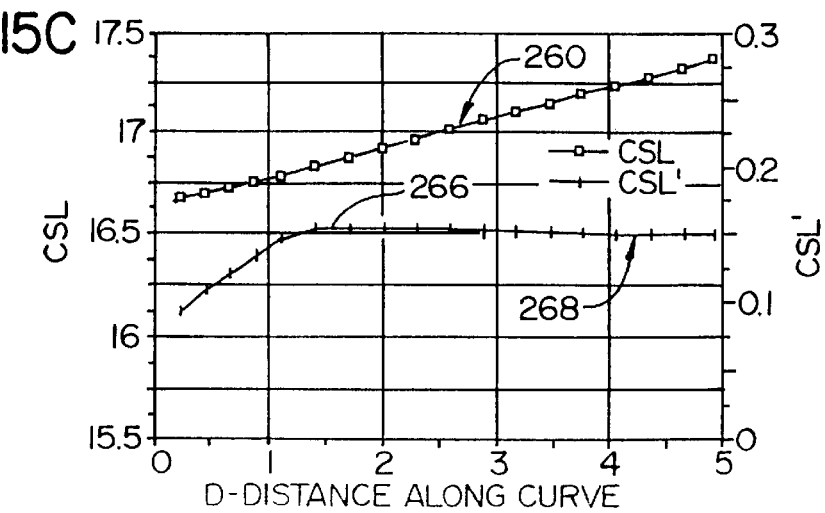

The plot of the derivative CSL' produces the curve 252 which is shown in FIG. 15C. As can be seen, the peak rate of chainstay lengthening occurs at a point 254 approximately 5 units of travel along the curve which is approximately at the 1 inch sag point (vertical displacement). The plot of CSL & CSL' vs. D thus clearly demonstrates the increasing rate of chainstay lengthening which occurs proximate the preferred pedaling position.

FIGS. 15A–15C show corresponding plots for the wheel travel path of FIG. 13C, i.e., the curve 220 having a relatively straight line slope in the area 222 below the point of inflection. As can be seen in FIGS. 15B and 15C (which correspond to FIGS. 14B and 14C and are, respectively, plots of CSL vs. the vertical position of the hub and CSL vs. the distance "D" along the curve), the rate of increase in chainstay lengthening reaches its peak just above the preferred pedaling position, i.e., at point 262 along the CSL plot 264 in FIG. 15B and at point 266 along the CSL' plot 268 in FIG. 15C. However, as is readily apparent from a comparison of FIG. 15C with the corresponding plot in 14C, the decrease in the rate of chainstay lengthening, particularly above the preferred pedaling position, is much more gradual with the wheel travel path having the "straight line" bottom segment than is the case with the S-shaped path.

Figure 16A:
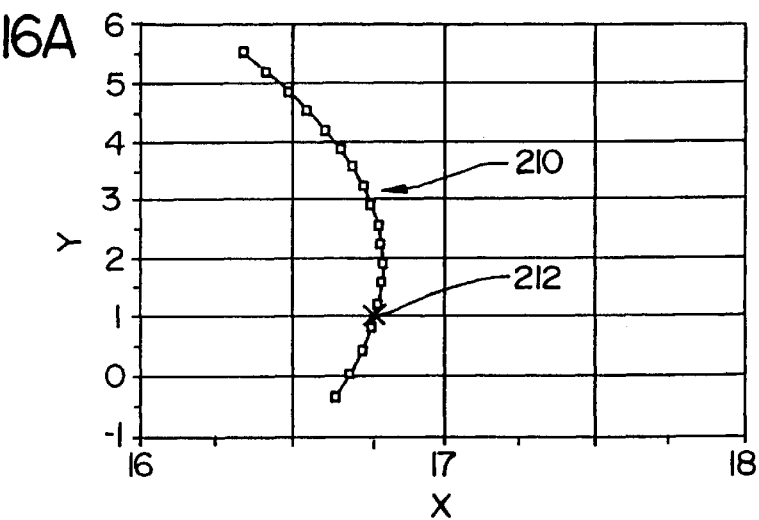
FIGS. 16A–16C are graphical plots similar to those shown in FIGS. 14A–14C and 15A–15C, but for the wheel travel path which is shown in FIG. 13D, in which the bottom portion of the path is formed by a forward curve having a radius larger than that of the curve which forms the upper portion of the path.
Figure 16B:
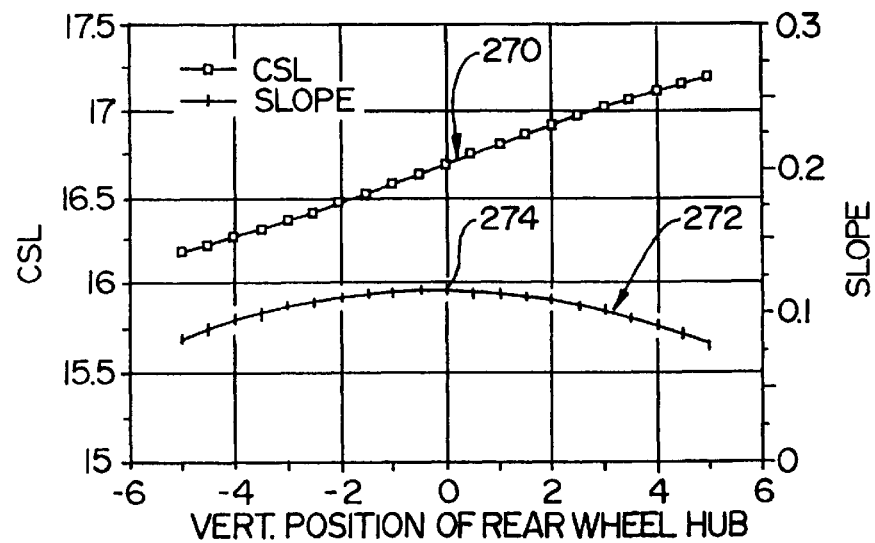
Figure 16C:
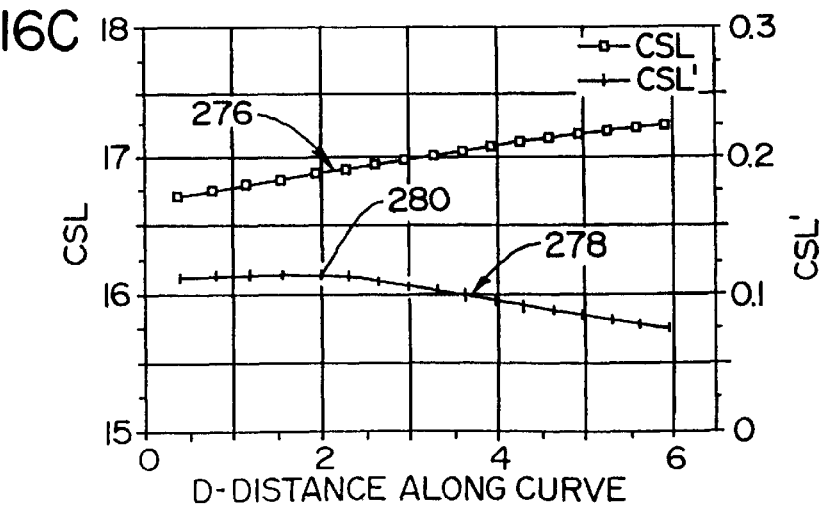

Finally, FIGS. 16A–16C are corresponding plots for the wheel travel path 210 in which the upper portion of the curve is formed by an arc having a radius which is smaller than the radius of the lower arc, and the lower portion is formed by an arc having a second radius which is greater than the first, and also greater than the radius from the bottom bracket. As can be seen in FIG. 16B, this produces a comparatively "straight" chainstay length (CSL) plot 270, with the plot 272 showing only a very gradual increase and decrease in the rate on either side of the peak 274.

FIG. 16C shows plots of CSL and CSL' vs. D, similar to FIGS. 14C and 15C. The CSL vs. D curve 276 is again almost a straight line, with the slope only gradually tapering off toward the upper limit of the suspension travel. As a result, the CSL' vs. S curve 278 is also very shallow, with only a very gradual increase in the rate of chainstay lengthening to a peak 280 near the preferred pedaling position, followed by a very gradual tapering off. For this reason, the curve 410 approaches the practical limit of a wheel travel path which will provide a chainstay lengthening effect in accordance with the present invention.

Figure 17:
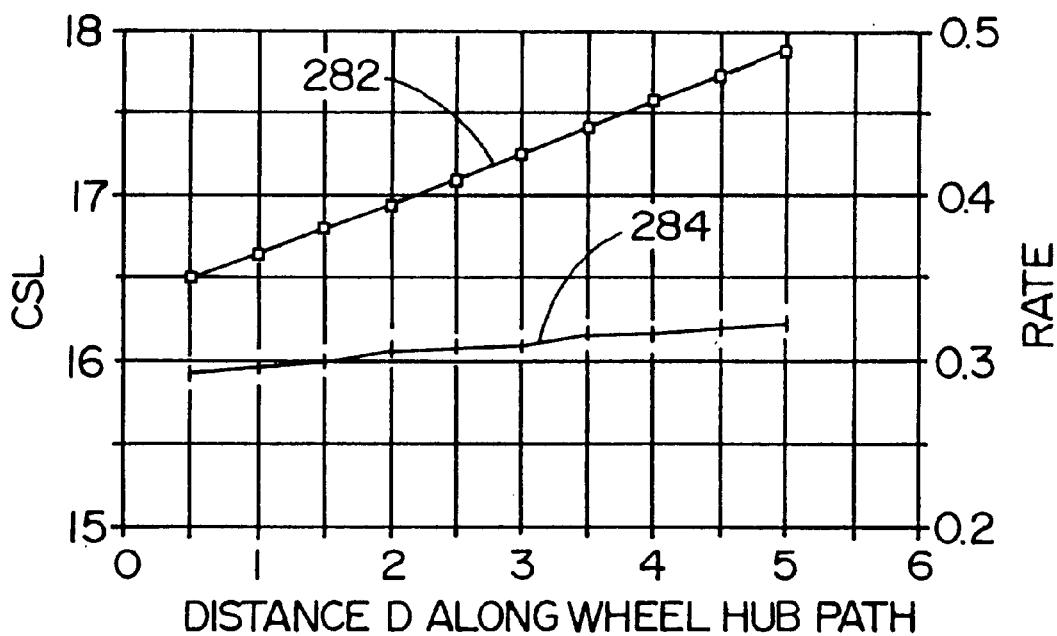
FIG. 17 is a graphical plot similar to those shown in FIGS. 14C, 15C, and 16C, but for a wheel travel path which is provided by prior art, forward pivot type suspension system, showing the failure of the prior art system to provide the chainstay lengthening effect at the appropriate points in its travel.
Figure 18:
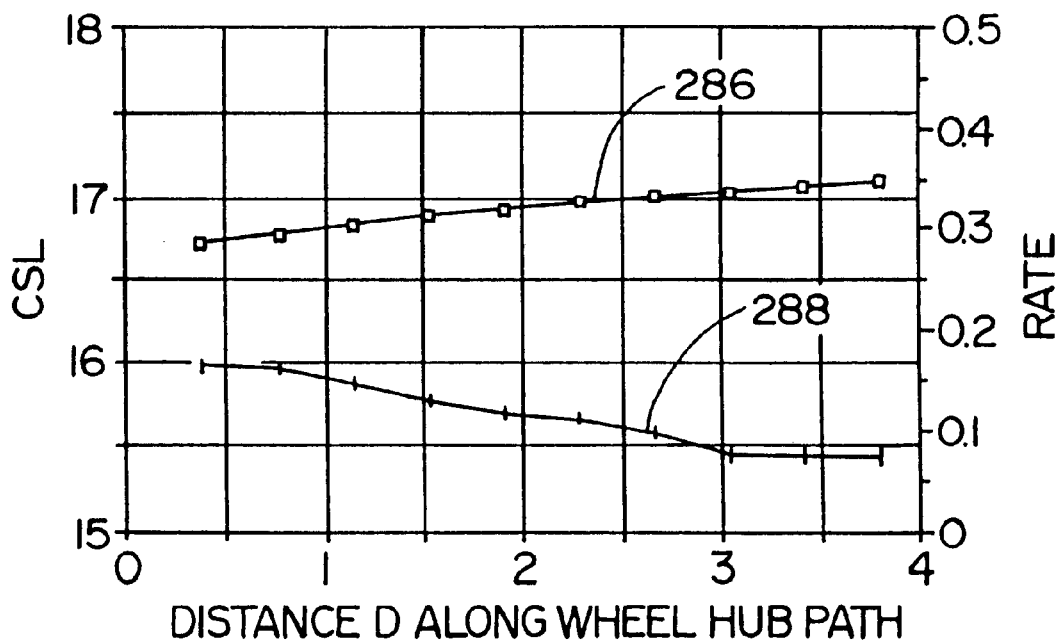
FIG. 18 is a graphical plot similar to that shown in FIG. 17, but for a four bar linkage type prior art suspension system, again showing the absence of the chainstay lengthening effect at the desired points during compression.

FIGS. 17 and 18 correspond to FIGS. 14C, 15C and 18C in that these are plots of CSL and CSL' vs. D, but show the curves which are produced two of the more advanced suspension systems which exist in the prior art. In particular, FIG. 17 is a plot of the curves which are produced by a single forward pivot design of a type which is used by several manufacturers, while FIG. 18 is a plot of the curves which are produced by a prior art four bar linkage-type system.

As can be seen in FIG. 17, the curve 282 representing the plot of chainstay length (CSL) vs. the distance (D) along the wheel travel path which is produced by the forward pivot system is a relatively straight-line curve of gradually increasing slope. The curve 284 representing the derivative CSL' vs. D therefore shows only a constantly increasing rate of chainstay lengthening as the suspension compresses. The "peak" in the CSL and CSL' vs. D curves—which is a key feature of the present invention—is completely absent from curves 282, 284. Moreover, for the reasons discussed above, the continuing increase in rate of chainstay lengthening toward the maximum point of compression causes undesirable pedal "feedback" in such forward pivot systems.

As can be seen in FIG. 18, the prior art four bar linkage systems suffer from essentially the reverse problem. As can be seen, the wheel travel path 286 of these systems has a slope which is a negative throughout its range. Consequently, there is a lack of any sort of "peak" along the plot 288 of CSL' vs. D, demonstrating that the prior art four bar linkage systems are also incapable of providing the chainstay lengthening effect which is a feature of the present invention.

iv. Mathematical Description of Curves

As shown above, the shape of the curve or path which is provided by the present invention can be described in terms of two relevant parameters, i.e., the chainstay length (CSL) and a distance (D) along the path which is traversed by the hub, beginning at the lowest position of the suspension. AS previously noted, the chainstay length parameter CSL is simply the distance from the centerline of the pedal sprocket shaft to the center of the rear wheel hub. The distance D, in turn, can be defined by selecting a series of closely spaced points along the path and adding up the incremental arc lengths to define a total distance along the curve that the hub has moved from its initial position.

The first derivative of CSL with respect to D, (which may also be called the slope of the curve CSL vs. D) represents the rate of change of the CSL parameter with respect to the distance D along the curve. As the wheel hub moves along its path, beginning from the lowest position and moving generally upward, this rate first exhibits an increase as D increases, reaches a maximum value, and then exhibits a decrease with a further increase in the distance D. Therefore, both an increase and a decrease of the rate of change of the CSL parameter must be present in order to provide the advantages of the present invention.

In mathematical terms, the rate of change, i.e., the first derivative of CSL with respect to the distance D, is defined by:

$$\text{rate}=d(CSL)/d(D)=CSL\text{'}$$

The increasing and decreasing of the rate, in turn, can be described in terms of the second derivative of CSL with respect to D, i.e.:

$$d^2(CSL)/(d(D))^2=d(\text{rate})/d(D)=CSL\text{'}\text{'},$$

where the term CSL" is positive as the hub moves upwardly along the path, goes through zero, and then becomes negative as the hub moves further upwards.

Thus, the wheel travel path which is provided by the present invention can be described as comprising the following, wherein $D_p$ is normally located proximate to, but not necessarily immediately at, the junction of the upper and lower curve portions:

(a) a preferred pedaling position at a selected position $D_p$ which is located along the wheel travel path;

(b) a lower curve portion extending generally below the position $D_p$ in which there is an increasing rate of chainstay lengthening with increasing compression of the suspension, such that the relationship $$\frac{d[CSL]}{d(D)}$$

is a curve which exhibits a generally positive slope and the derivative $$\frac{d^2[CSL]}{(d(D))^2}$$

is positive, i.e., the first derivative is increasing and the second derivative is positive; and (c) an upper curve portion extending generally above the preferred pedaling position $D_p$ in which there is a decreasing rate of chainstay lengthening with increasing compression of the suspension, such that the relationship $$\frac{d[CSL]}{d(D)}$$

is a curve which exhibits a generally negative slope and the derivative $$\frac{d^2[CSL]}{(d(D))^2}$$

is negative, i.e., the first derivative is decreasing and the second derivative is negative.

e. Simplified Dual Eccentric Mechanism

Figure 19:
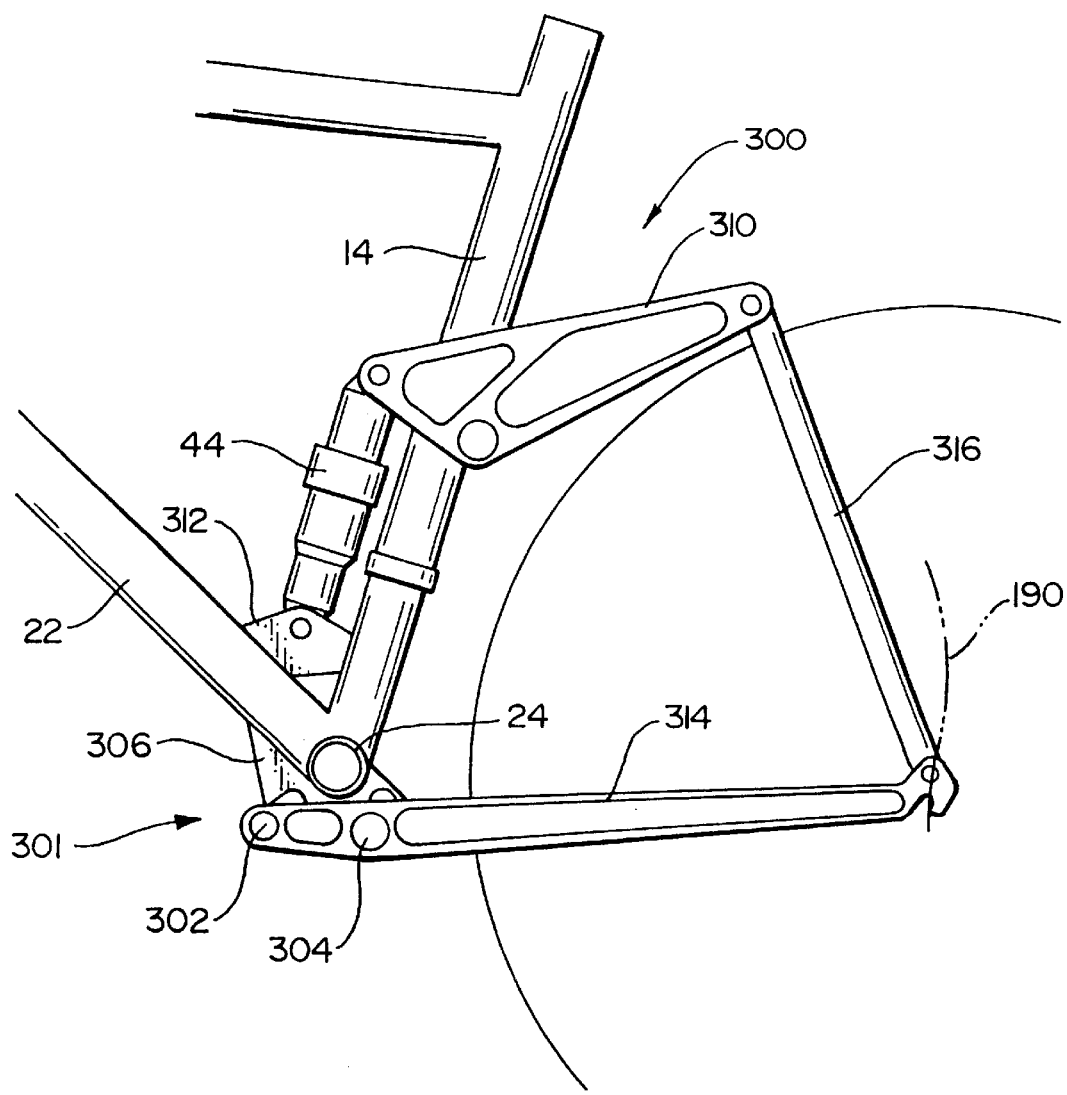
FIG. 19 is an elevational view of an embodiment of the present invention which is similar to that shown in FIGS. 2–7, but in which the eccentric crank members are both mounted below the bottom bracket and also closer together, which construction enhances the strength and economy of the assembly.

FIG. 19 shows a suspension assembly 300 in accordance with the present invention, which is similar to that which has been described above with respect to FIGS. 2–10 and provides substantially the same wheel path, but in which the assembly, and the eccentric crank mechanism in particular, have been somewhat simplified and strengthened.

Referring to FIG. 19, both of the eccentric is crank members 302, 304 are positioned below the bottom bracket shell 23, on a downwardly extending. frame bracket 306, while at the upper end of the assembly there is a rocker arm or top link member 310. As with the similar embodiment described above, the forward end of the rocker arm member is pivotally mounted to the upper end of a spring/damper unit 44; in this embodiment, however, the fulcrum of the top-link has been moved down the seat tube so as to allow the lower end of the spring/damper assembly to be pivotally mounted to a simplified bracket 312 which bridges the lower ends of the seat and down tubes 14, 22. This also allows easier adaptation to smaller-size frames.

The lower swing arm member 314, and the upper swing arm member 316 are generally similar to the corresponding elements which have been described above, although the forgings/castings have been simplified for economy of manufacture and enhanced strength.

FIG. 20 illustrates the combined pivoting motion of the dual eccentrics 302, 304 which provides the desired wheel travel path. FIG. 21 also shows the somewhat bifurcated construction of the downwardly extending frame bracket 306 having forwardly and rearwardly extending portions which support the two crank members.

Figure 21A:
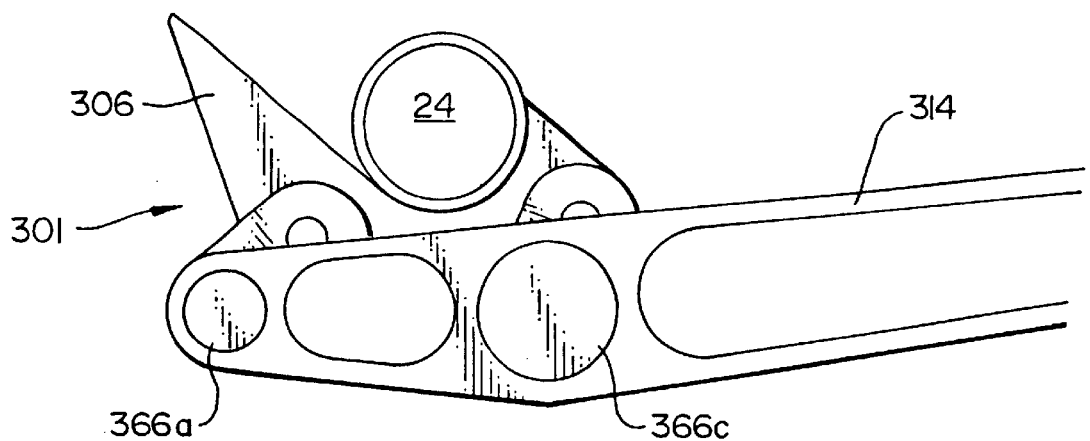
FIG. 21A is an elevational view of the eccentric crank mechanism of the assembly which is shown in FIG. 19.
Figure 21B:
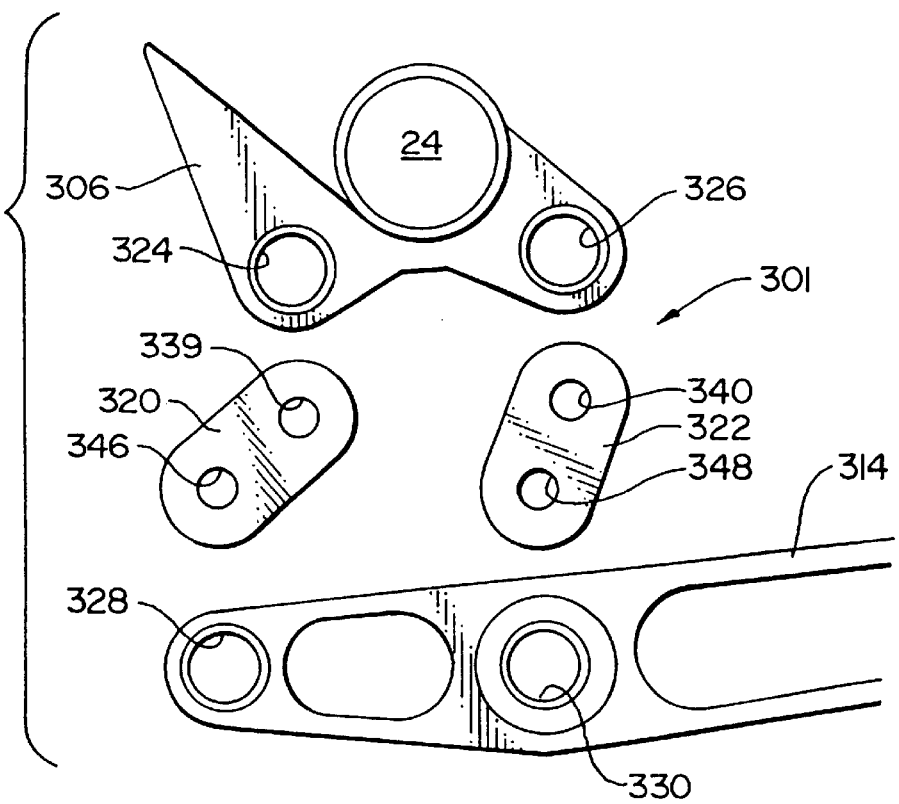
FIG. 21B is an elevational, partially-exploded view of the eccentric crank mechanism of FIG. 21A.

As can be seen in FIGS. 21A–21B, the forward and rearward eccentric members 302, 304 comprise pivoting links 320, 322, having upper ends which are supported for pivoting movement in the frame bracket 306 by bearings 323, 326, and lower ends which are supported for pivoting movement on the forward end of the lower swing arm member 314 by bearings 328, 330.

Figure 22:
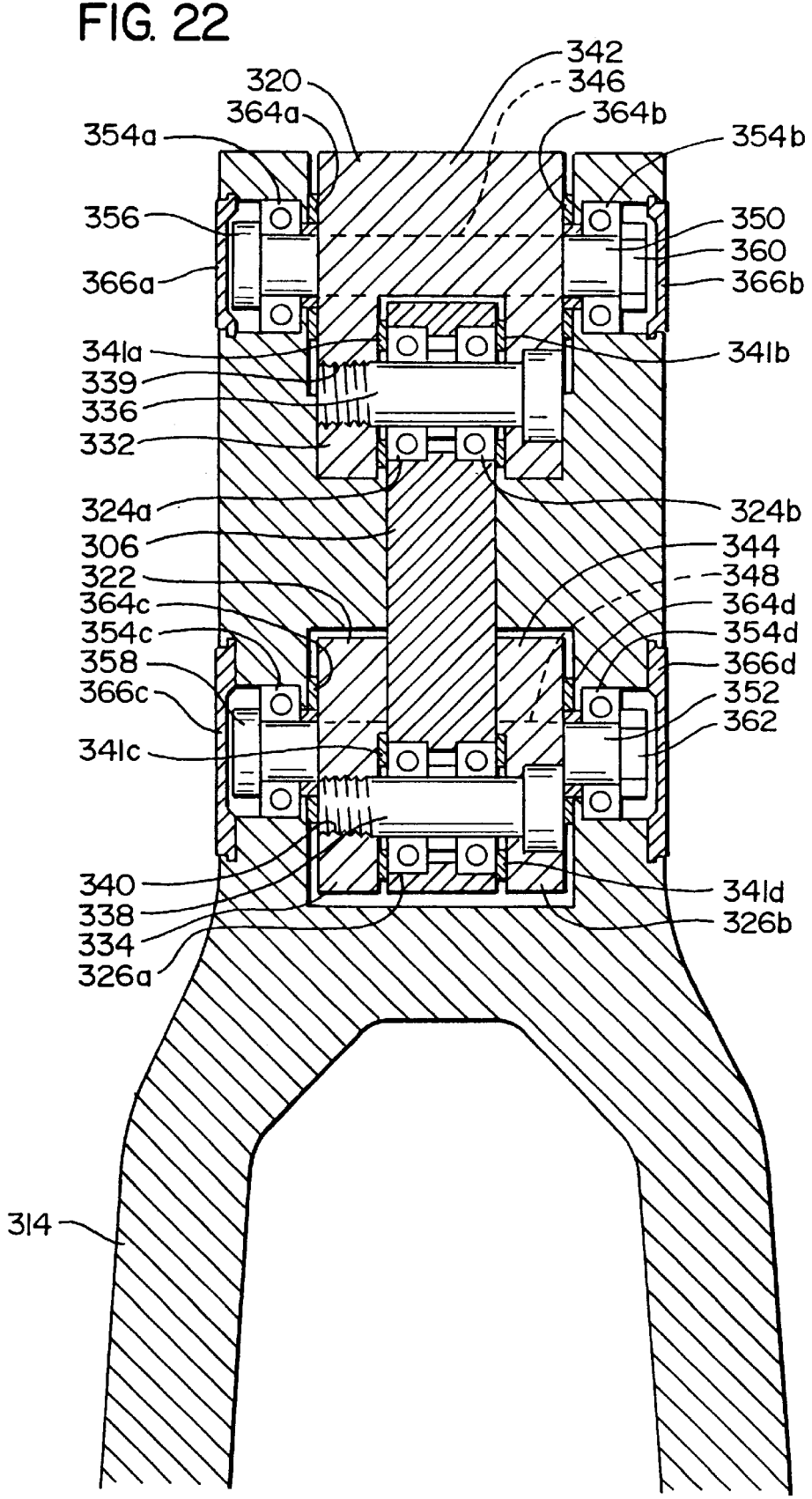
FIG. 22 is a top view of a cross-section taken horizontally through the eccentric crank mechanism of FIGS. 19–21B.
Figure 23:
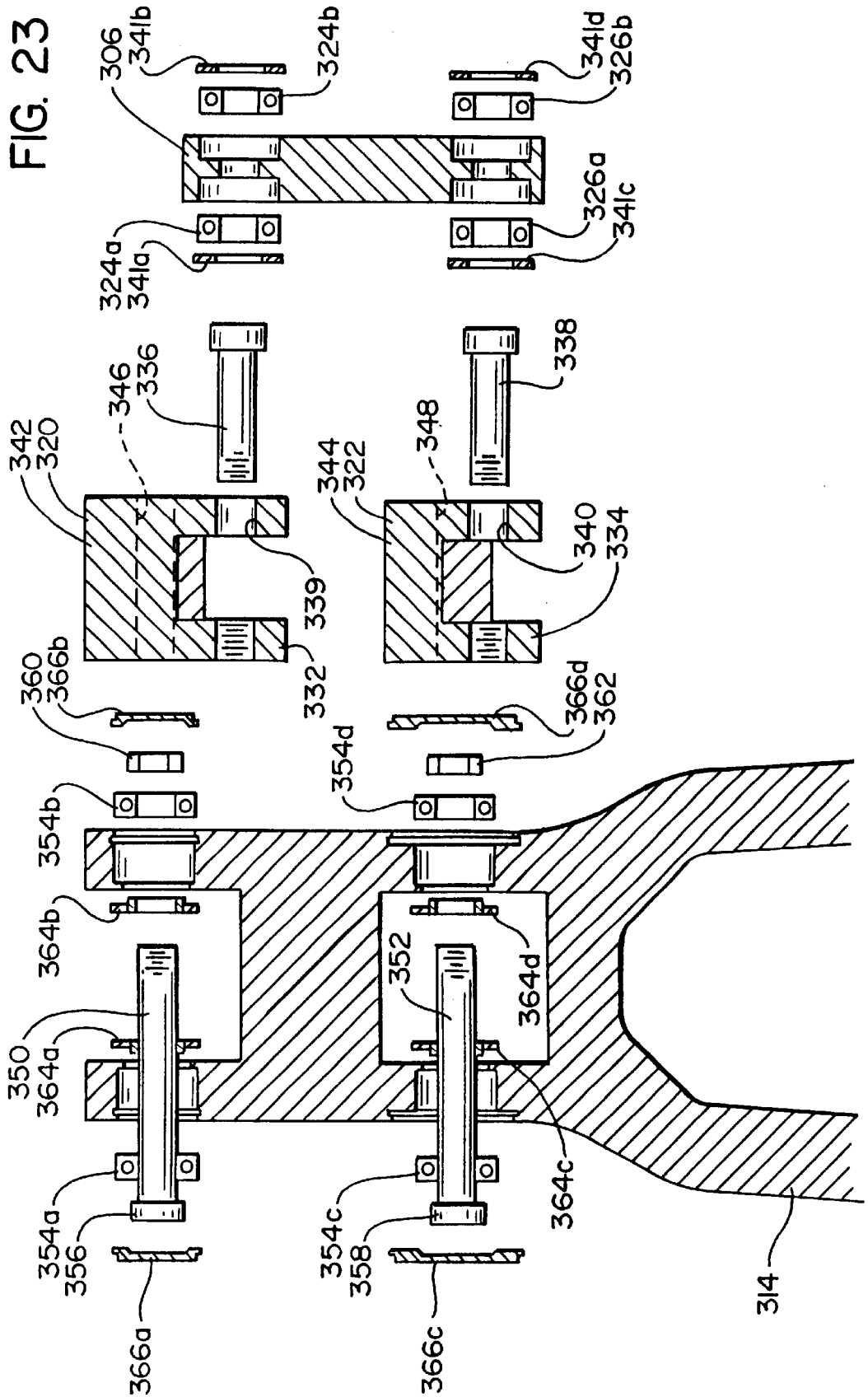
FIG. 23 is an exploded view of the assembly which is shown in FIG. 22.

As is shown in FIGS. 22 and 23, the upper ends 332, 334 of the crank links 320, 322 are bifurcated so as to form a slot for receiving the lower edge of frame bracket 306. Pivot pins 336, 338 are threadedly mounted in bores 339, 340 in the upper ends of the links, and extend through bearings 324a,b and 326a,b, which are located in recesses formed in the sides of the frame bracket 306. Thrust washers 341a–d are sandwiched between the outer surfaces of the bearings 324, 326 and the inner surfaces of the pivoting links 320, 322.

The lower, non-bifurcated ends 342, 344 of the crank links have bores 346, 348 which provide support for the middle portions of the lower pivot pins 350, 352. The outer ends of the two lower pivot pins are supported in recesses in forward end of the lower swing arm member by bearings 354a–d. The pivot pins are provided by hardened bolts, with bolt heads 356, 358 on one end and lock nuts 360, 362 on the other which engage the outer surfaces of the bearings 354a–d so as to provide a predetermined amount of preload. The inner surfaces of the bearings, in turn, engage thrust washers 364a–d which abut the outer surfaces of the two pivoting links 320, 322. To exclude dirt and water from the bearings, the recesses in the swing arm member are covered by removable dust caps 366a–d.

In this embodiment, the eccentrics are positioned closer together on the frame than in the configuration which was described above. As a result, the difference between the angles of the eccentrics must be significantly less; for example, in the particular embodiment which is illustrated, in which the spacing between the axes of the two eccentrics is approximately 2.5 inches, the initial angle between them may be only about 30°, e.g., 135° and 160° forward of TDC.

The advantages of the embodiment which is shown in FIGS. 19–23 lie primarily in its cost, strength, simplified production, and serviceability. For example, the simplified embodiment uses fewer parts and requires less welding. Furthermore, by moving the dual eccentrics closer together and positioning them underneath the bottom bracket shell, it is no longer necessary to construct the chainstay (i.e., the lower swing arm member) assembly out of several pieces, but instead both this and the linkage attachments (as well as the pivoting top-link) can be fabricated as a single unit. Also, the reduction in the number of brackets used reduces the amount of welding and bolting which is required.

The embodiment which is illustrated in FIGS. 19–23 also provides the advantage of increased lateral stability. Firstly, the one-piece, shear-stress reinforced design of the top link 310 will resist twisting forces applied to the rear wheel. Also, resistance to lateral movement is increased by the design of the chainstay/lower swing arm member 314. Firstly, the one-piece double cross-braced design is inherently stiff; secondly, by moving the dual eccentrics closer together, the front eccentric is able to provide a relatively greater percentage of the stability of the entire pivot mechanism.

The simplified assembly 300 is also relatively less sensitive to bearing and bushing tolerances, inasmuch as the primary force on the bearings in this embodiment is linear rather than radial. The thrust washer bushings can be interference fit between the eccentrics, mounting bracket, and chainstay assembly to avoid play. Also, while the embodiment which is illustrated uses bolts to provide the necessary preload on the eccentric shafts, it is possible to machine the desired preload for the thrust washers into the parts themselves, thus eliminating the need for bolts and allowing for the use of simple and inexpensive shafts and spring clips.

As yet another advantage, the suspension assembly 300 which is illustrated in FIGS. 19–23 enjoys significantly enhanced long-term durability. In particular, by distributing the forces of the chainstay member "in parallel" between two sets of pivots (as opposed to "in series" as in a four-bar linkage or Horst-link design), the noticeable effects of long-term wear are greatly reduced. Moreover, the nominal bearings and inexpensive bushings can easily be replaced if significant wear does occur.

f. Additional Configurations i. Friction Bushing System

Figure 24:
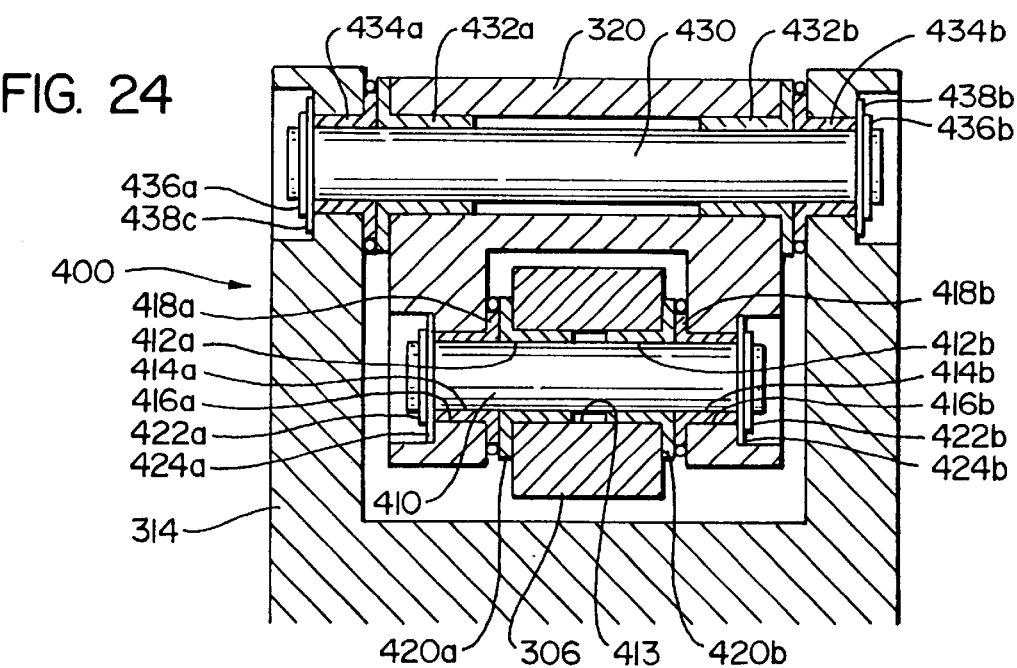
FIG. 24 is a view similar to that of FIG. 22, showing a top view of a cross-section taken horizontally through the forward part of the eccentric crank mechanism of the lower pivot portion of the assembly, illustrating an embodiment in which the ball bearings are replaced by friction bushings to provide a friction dampening effect as the suspension is compressed.

FIG. 24 shows the front part of a lower pivot assembly 400 which is generally similar to the lower pivot assembly 400 which was described above with reference to FIG. 22, except that friction bushings have been substituted for ball bearings. Accordingly, the assembly 400 comprises the same basic lower swing arm member 314, pivoting link member 320, and frame bracket 306. However, the upper pivot pin 410 is supported by bushings 412a, 412b which are mounted in bore 413 in frame bracket 306. The outer ends of the pivot shaft, in turn, are supported in friction bearings 414a, 414b which are mounted in cooperating bores 416a, 416b in the upper portion of the crank link 220. The friction bushings have inwardly directed thrust flanges 418a, 418b which engage corresponding outwardly directed thrust flanges 420a, 420b on the first set of bushings. Snap rings 422a, 422b in grooves at the ends of the pivot shaft retain washers 424a, 424b against the sides of the crank link to hold the assembly together. Similarly, where the lower pivot shaft 430 engages the forward end of the swinging arm 314, the ends of the pivot rod are carried in corresponding bushings 432a, 432b and 434a, 434b, and the pivot shaft is retained by snap rings 436a, 436b and washers 438a, 438b.

It will be understood that substantially identical friction bushing assemblies are employed at the rearward crank link, although for the sake of clarity these are not shown in FIG. 24.

The advantage of the friction bushing configuration relative to the more "efficient" ball bearing system which has been described above is that the plain bushings will provide a slight amount of friction which serves to minimize wheel movement during normal riding, while allowing the suspension to remain sufficiently compliant to absorb any significant bump forces which are encountered. As a result, excessive compliance (or "jiggling") which may occur with the more efficient ball bearing construction is minimized or eliminated.

Moreover, increased pedaling forces are accompanied by an increase in the horizontal forces on the bushings, as a result of chain tension and the opposing force which is generated due to the wheel travel path of the present invention. The net effect of this is to increase the resistance which is offered by the friction bushings under these conditions, which in turn renders the suspension less compliant and consequently more efficient at times of increased pedaling effort.

Still further, if relatively higher friction bushings are used on the rearward eccentric, the friction which is offered by the bushings will manifest itself to the greatest degree as the wheel approaches the top portion of its travel, in other words, as the suspension approaches the limit of its compression. This is due to the fact that a greater rotation of the rearward eccentric occurs as the wheel hub moves toward the upper end of the curve. Thus, by providing a higher coefficient of friction on the rearward bushings, an increased friction damping effect is provided at the top of the wheel travel path. This "simulates" the variable dampening action of a shock absorber, so that models using the friction bushing system may employ much cheaper springs without viscous dampening, or a simple urethane bumper or a cross frame, without development of excessive rebound force of the spring at full compression.

Any bushings which provide the desired degree of friction may be employed in this construction. However, lead-teflon impregnated porous bronze bushings are particularly suited for this purpose, bushings of this type being available from Garlock, Inc., 1666 Division St. Palmyra, N.Y. 14522 and Permaglide bushings from INA Bearing Co. Ltd, 2200 Vauxhall Place, Richmond, B.C., Canada V6V 1Z9.

ii. Eccentric Crank Members

Figure 25A:
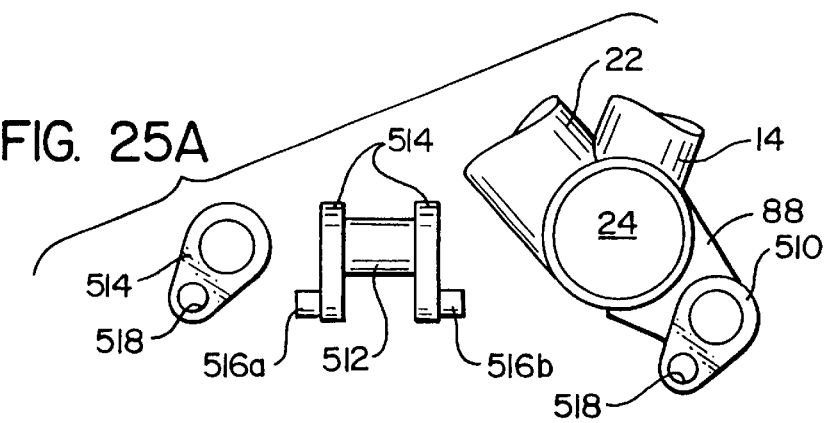
FIGS. 25A–25B are exploded views showing first and second configurations for the eccentric crank members which are employed in the lower pivot portion of the suspension system shown in FIGS. 1–5.
Figure 25B:
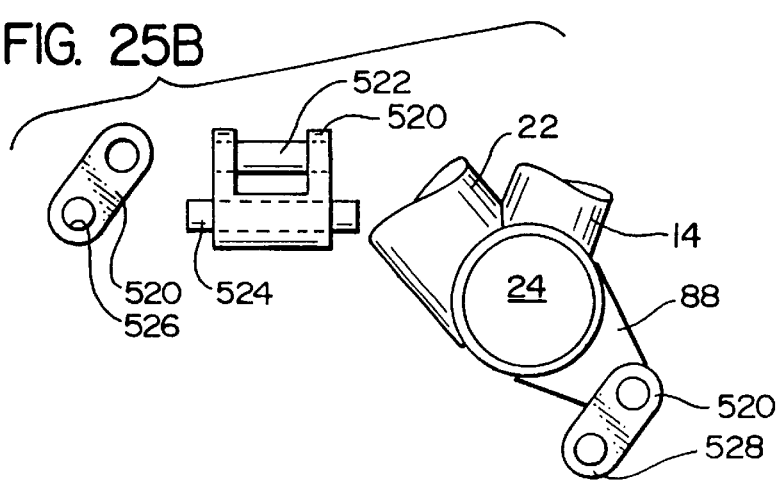

FIGS. 25A and 25B show first and second constructions for the eccentric crank members which are used in the suspension system which has been described above.

Specifically, FIG. 25A shows a first form of crank member 510 in which there is a spindle portion 512 which passes through a cooperating bore formed in the rear frame lug 88. The lobe portions, in turn, are formed by end plates 214 which are pressed or keyed onto the outer ends of the spindle 512, with offset pin members 516a, 516b being mounted in the smaller, offset bores 518 of the end plates.

FIG. 25B, in turn, shows a form of eccentric crank in which there is a U-shaped yoke 520 (which may be, for example, a forged or cast member) which fits over the frame bracket 88 and is mounted thereto by a first pivot pin 522. The offset mount for attachment to the pivot assembly framework is provided by a second pivot pin 524 which is driven through a cooperating bore 526 formed in the depending end 528 of the yoke.

iii. Bottom Pivot Arms

Figure 26A:
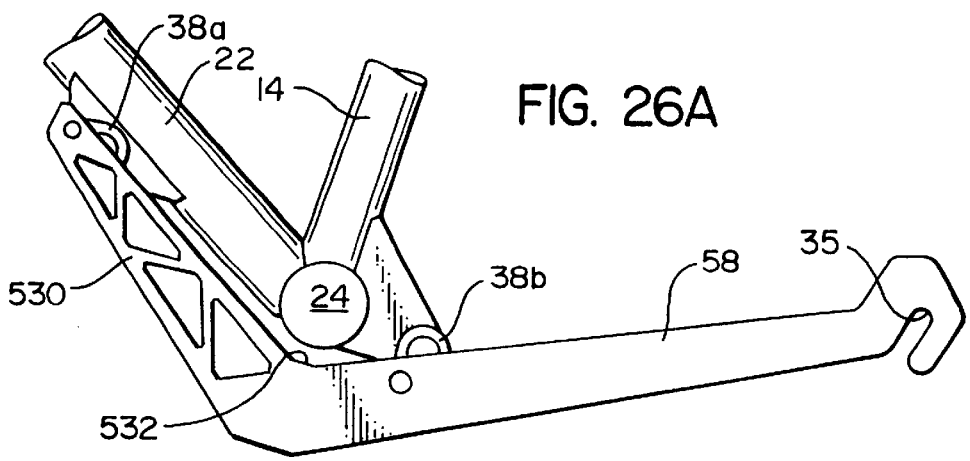
FIGS. 26A–26B are elevational views of first and second configurations of lower pivot assemblies in which the framework for the eccentric crank members is provided by an extension which is mounted to the forward end of the wheel control arm.
Figure 26B:
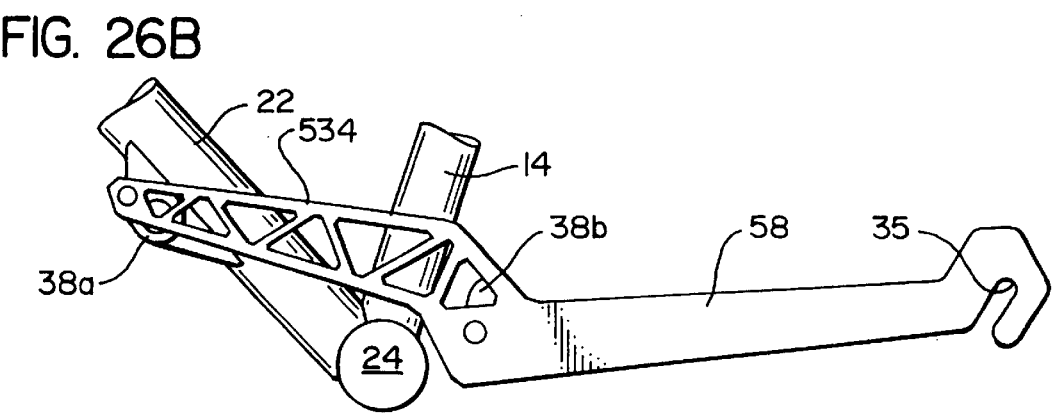

FIGS. 26A and 26B show embodiments in which the framework of the bottom pivot assembly, rather than surrounding the bottom bracket shell 23, passes either above or below this.

In particular, FIG. 26A shows an embodiment in which the forward end of the linear control arm 58 is mounted directly to the rear eccentric crank member 38b, and extends beyond this underneath the bottom bracket shell 23. An extension arm portion 530 extends upwardly and forwardly from the forward end of the control arm, and provides the mounting point for the forward eccentric crank member 38a. Sufficient clearance is provided at the inside junction 532 of the support arm and extension arm to clear the bottom bracket shell during operation of the assembly.

Figure 27A:
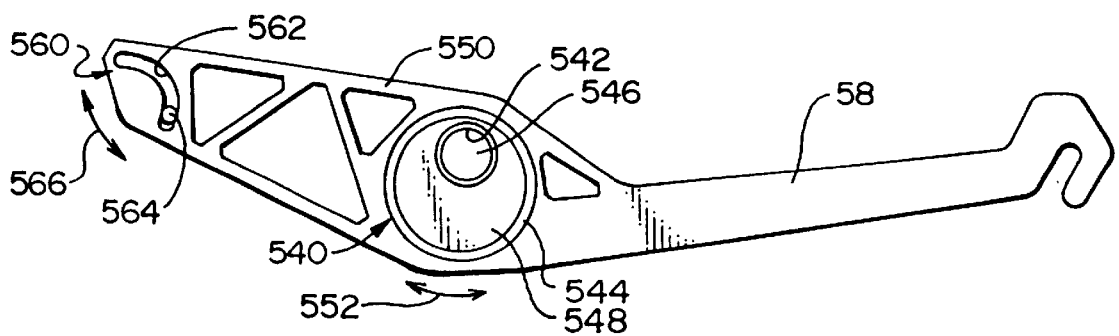
FIG. 27A is an elevational view of the lower pivot assembly of an embodiment of the present invention in which the eccentric crank members shown in FIGS. 2–7B are replaced by an eccentric bearing assembly and frontal cam mechanism.

FIG. 26B shows a bottom pivot assembly which is essentially similar to that of FIG. 27A, except that an extension arm portion 534 is provided which passes above, rather than under, the bottom bracket shell 23.

iv. Eccentric Bearing Mechanism

Figure 27B:
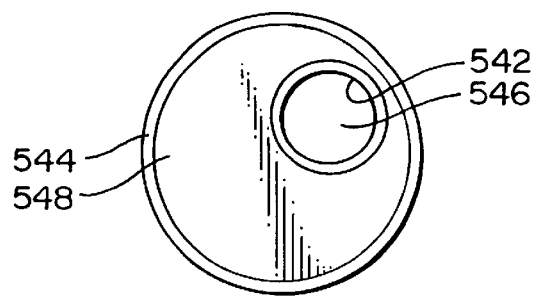
FIGS. 27B–27C are elevational and cross-sectional views of the eccentric bearing assembly of FIG. 27A.
Figure 27C:
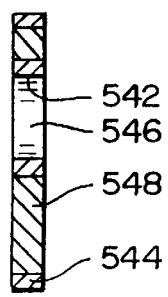

FIGS. 27A–C illustrate an embodiment of the present invention in which the rearward eccentric crank mechanism is replaced by an eccentric bearing assembly 540. The eccentric bearing assembly is provided with inner and outer offset bearing rings 542, 544, and an opening 546 which surrounds the bottom bracket shell/crankset of the bicycle.

As can be seen in FIGS. 27B–27C, the rotational axis of the inner bearing ring 542 is offset from that of the outer bearing ring 544. The inner and outer bearing rings may suitably be large-diameter rotating ball bearings, and are joined by a suitably shaped spacer disk or matrix 548. Inasmuch as the bearing structure permits the framework 550 of the lower pivot assembly to rotate on an eccentric path about the bottom bracket shell, as indicated by arrow 552, this assembly provides a motion which corresponds to that which is provided by the rear eccentric crank member in the embodiment of the system which has been described above.

A forward eccentric crank member such as those which have been described above can be used in conjunction with the eccentric bearing assembly 540. Alternatively, FIG. 27A illustrates a construction in which the eccentric crank member is replaced by a frontal cam mechanism 560. As can be seen, this comprises a cam surface in the form of a channel 562 which is cut in the forward end of the framework, and a cam follower in the form of a pin member 564 which is mounted to the forward frame section of the bicycle and extends outwardly from this into engagement with channel 562. Thus, the rocking motion of the pivot assembly moves the pin member through the cam channel, imparting the cam motion indicated by arrow 566, which corresponds to that which is imparted by the forward eccentric crank member described above.

v. Cam Slot and Follower Mechanism

Figure 28A:
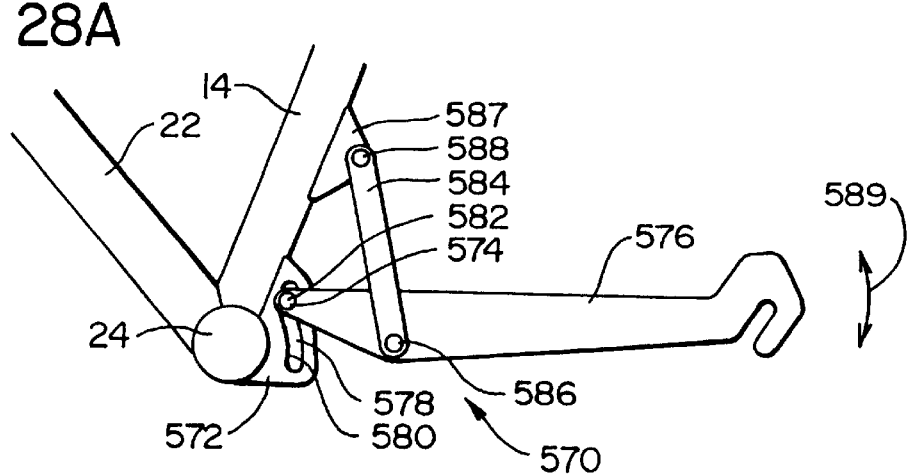
FIGS. 28A–28B are elevational views of the lower pivot assemblies of first and second embodiments of the present invention in which the wheel travel path is effected by a cam face in a slot through which a follower pin travels as the suspension is compressed, the embodiment which is shown in FIG. 28A having the cam face mounted to the forward frame section, and the embodiment shown in FIG. 28B having the cam face formed on the forward end of the chainstay member.
Figure 28B:
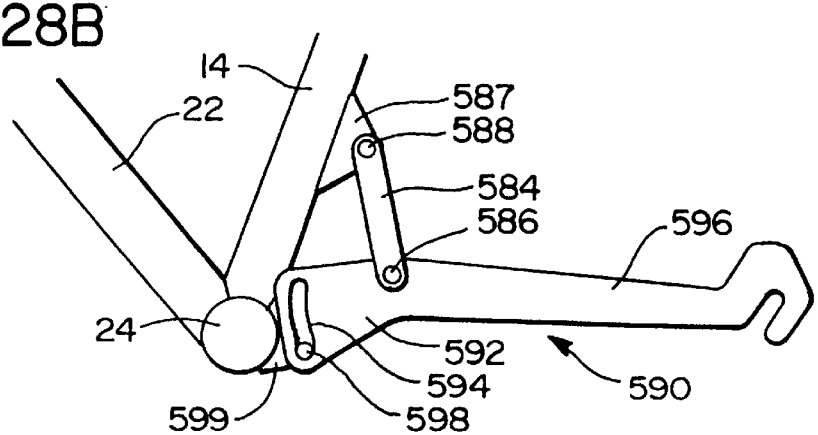

FIGS. 28A–28B illustrate two configurations of lower pivot assembly in accordance with an embodiment of the present invention in which the correct wheel travel path is provided by a channel or slot or channel having a cam face, and a roller or pin which rides in this slot as the suspension is compressed so as to impart the desired S-shaped curvature to the wheel travel path.

In particular, in the construction which is shown in FIG. 28A, the pivot assembly 570 comprises a cam plate 572 which is mounted to and behind the bottom bracket shell 23 and seat tube 14, and a cam follower 514 which is mounted to the forward end of the lower swing arm member 576. The cam plate 572 is provided with a slot 578 having edges which form a cam face 580; the shape of the S-shaped cam face 580 corresponds to the S-shaped wheel travel path, but in an inverted orientation.

The cam follower 574, in turn, is formed by a transversely extending roller pin 282; this fits closely within the cam slot 578 in engagement with the cam surfaces thereof, so that the follower follows the path which is prescribed by the cam faces when the pin travels in a vertical direction through slot 578. Rearwardly of the cam follower but still towards its forward end, the lower swing arm member 576 is supported by a connecting arm 584 which is pivotally mounted to the swing arm member at its lower end (pivot pin 586), and to a frame bracket 587 on the seat tube at its upper end (pivot pin 588).

Accordingly, as the rearward end of the lower spring arm members is displaced vertically in the directions generally indicated by arrow 589, the roller pin 574 is driven vertically up and down through the slot 578 in the cam plate, so that the cam surface forces the rear axle to follow the desired wheel travel path.

FIG. 28B shows a pivot assembly 590 which is generally similar to that which has been described with reference to FIG. 28A, with the exception that the cam plates 592 and cam slot 594 are formed on the forward end of the lower swing arm 296, while the cam follower pin 598 is fixedly mounted to frame bracket 599 on the bottom bracket shell. Accordingly, in this embodiment, the cam plate and slot move downwardly past the follower pin as the suspension is compressed, instead of vice-versa as in the embodiment which is illustrated in FIG. 28A.

Figure 29A:
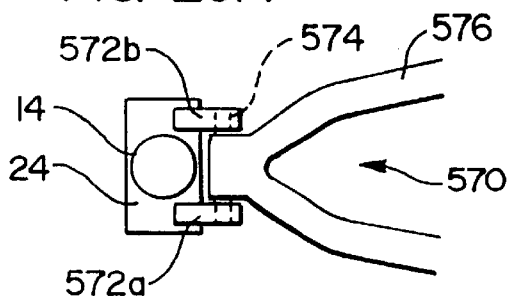
FIGS. 29A–29B are plan views of the cam slot/pin follower mechanism of the lower pivot assemblies which are shown in FIGS. 28A and 28B, respectively.
Figure 29B:
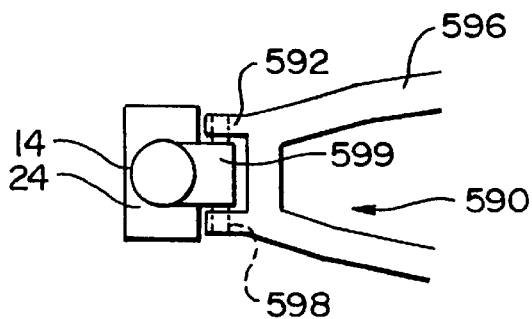

FIGS. 29A and 29B are top views of the cam plate/cam follower configurations of the two pivot assemblies 570, 590. As can be seen in FIG. 29A, the two cam plates 572a, 572b flank the forward end of the swing arm member 576, and the roller pin 574 extends transversely from this into the two cam slots. In FIG. 29B, in turn, the two cam plates 592 on the forward end of the swing arm flank the bracket 599 on which the follower 598 is mounted. The use of first and second cam plates has the advantage of increasing the cam surface area so as to reduce wear and increase longevity of the assembly, however, it will be understood that the arrangements which are illustrated in FIG. 29A and 29B can be "reversed" if desired, so that there is a single cam plate member which is flanked by first and second brackets supporting the follower pin.

vi. Counter-rotating Link Mechanism

Figure 30:
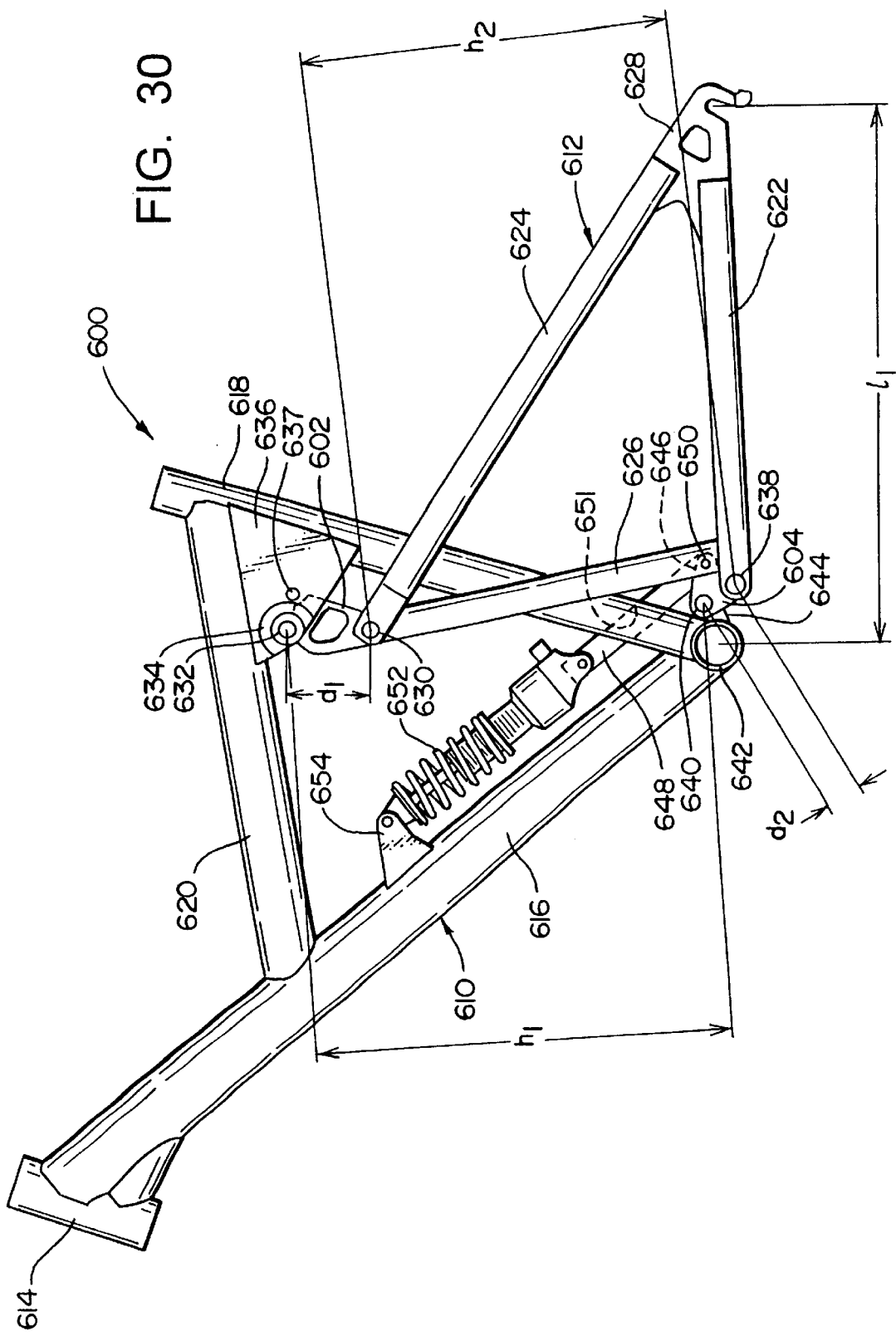
FIG. 30 is a side elevational view of a frame set having a rear suspension system in accordance with another embodiment of the present invention, in which there are upper and lower counter-rotating link members at a comparatively wide spacing which produce the wheel travel path of the present invention.

FIG. 30 shows a frame 600 in which the desired wheel travel path is produced by the action of comparatively widely spaced apart, counter-rotating upper and lower link members 602, 604, as opposed to the links spaced closely adjacent the bottom bracket shell, as in the embodiments described above. This embodiment has the advantage of simplicity, in that the number of pivot points/bushings is reduced relative to certain of the embodiments described above, and it is also less sensitive to machining tolerances, due to the widely spaced apart centers of the upper and lower pivot points. Moreover, this assembly is capable of being mounted in a smaller frame, for use by riders having a smaller stature or as may be desired for certain types of riding; for example, the embodiment of the invention which illustrated in FIG. 30 is capable of producing the desired wheel travel path in 5" or more of vertical wheel travel in a 16" frame. This embodiment is also particularly suited to producing wheel travel paths which are tailored to certain types of bicycles (particularly single chain ring bicycles) as will be described in greater detail below.

Accordingly, as can be seen in FIG. 30, the fame set 600 includes a generally triangular forward frame section 610 which is joined to a pivoting rear frame section 612 by the upper and lower eccentric link members 602, 604. The forward frame section includes the steering tube 614, the front down tube 616, the saddle tube 618, and the top tube 620; as was noted above, the configuration of this embodiment of the suspension permits the top tube 620 to be positioned lower than possible with certain other embodiments of the suspension system, thereby providing a low stepover height for the rider.

The pivoting rear frame section 612, in turn, is another triangular assembly, which includes chain and seat stays 622, 624, and somewhat vertically extending front stays 626; although only one of each of these stays is visible in the side view of FIG. 30, it will be understood that second, corresponding stays extend on the opposite side of the frame, parallel to the members which are shown.

A pair of dropouts 628 are mounted at the apexes of the chain and seat stays 622, 624, for carrying the rear wheel axle as described above. Also somewhat similar to the embodiments which have been described above, the forward ends of the chainstays 622 (at the bottom front corner of the triangular rear frame section) are mounted to the first eccentric link member 604. However, in the embodiment which is shown in FIG. 30, the second eccentric link member 602 is mounted at the upper front corner of the rear frame section, at the juncture of the seat stays 624 and the vertical front stays 626; as can be seen in FIG. 30, the seat and front stays 624, 626 extend on either side of the saddle tube 618, so that the pivot connection to the upper eccentric link member 602 is positioned forward of the saddle tube 618, while the lower link member 604 is positioned on the oppositie side of this tube, behind the long axis.

The pivot connection 630 at which the rear frame section is mounted to the upper link 602 is positioned a spaced distance $d_1$ below and slightly forward of the pivot connection 632 at which the link is mounted to the forward frame section. As can be seen in FIG. 30, this upper pivot connection is preferably mounted in a boss 634 on a gusset plate 636 which extends between the top and saddle tubes, to provide a stout, durable upper mounting point. A stop pin 637 is mounted transversely through the gusset plates behind the upper link member 602, to prevent the latter from "toggling over" backward when the suspension reaches the lower limit of travel (i.e., when the suspension is fully extended).

Similarly, there is a spaced distance $d_2$ between the lower pivot connection 638 at which the lower front corner of the rear frame section is joined to the lower link member 604, and the joint 640 which joins this link to the front frame section. With respect to the forward frame section, the lower link member 604 is mounted adjacent to and behind the bottom bracket shell 642, on a rearwardly extending, bracket 644.

As can also be seen in FIG. 30, the lower link member 604 has a rearwardly extending bellcrank portion 646 which is mounted to the lower end of a push rod 648, at pivot connection 650. The push rod 648 extends upwardly through a bore 651 in saddle tube 618 (which may be formed, for example, by a short piece of tubing welded into an opening cut through tube 618) and is mounted to the lower end of a shock absorber 652, the upper end of the shock absorber being mounted to the down tube of the forward frame section by a fixed bracket 654. Although the shock absorber 652 may be of any suitable type, a shock absorber unit having an adjustable air damping system and an adjustable coil spring, as shown, is eminently suitable for this purpose. Thus, as will be described in greater detail below, compression of the rear suspension section, acting through the bell crank portion of the lower link member 604, causes compression of the shock absorber unit 652.

In the exemplary embodiment which is illustrated, suitable dimensions for the members include the following:

Upper link pivot center spacing $d_1$—2.5836"

Lower link member pivot center spacing $d_2$—1.1700"

Pivot spacing $h_1$ between link member forward frame connections—12.9924"

Spacing $h_2$ between link member rear frame pivot connections—1.4991"

Initial chainstay length $l_1$ (between bottom bracket center and rear axle)—16.9216"

Figure 31A:
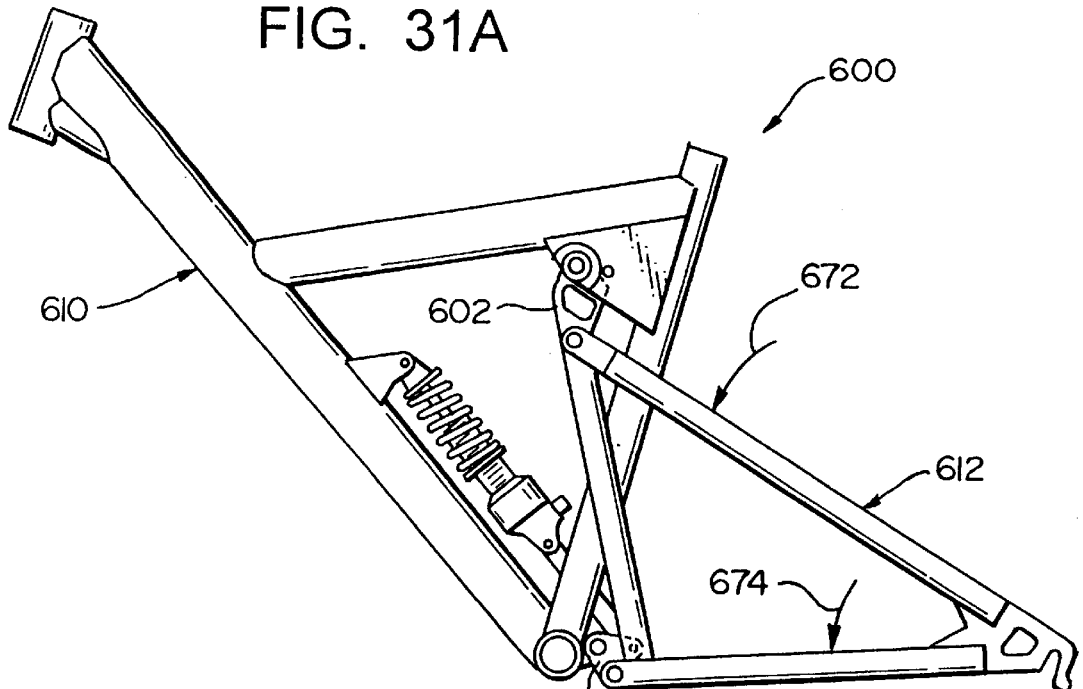
FIGS. 31A and 31B are first and second elevational views of the frame set of FIG. 30, showing the motion of the counter-rotating links and the compression of the shock absorber unit as the system undergoes compression, and also the somewhat rotational motion which the pivoting rear frame section develops.
Figure 31B:
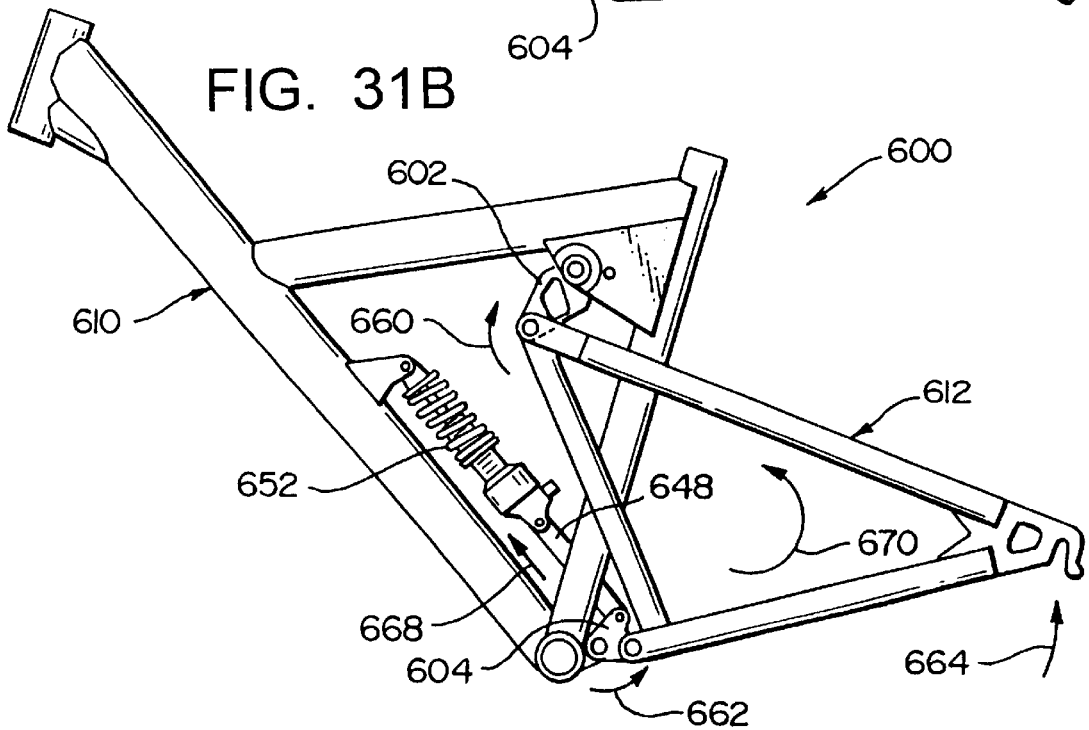

FIGS. 31A and 31B illustrate the motion which is provided by this embodiment of the suspension system of the present invention as it is compressed, for example, by external bump forces. In particular, as the system moves from the initial, uncompressed configuration shown in FIG. 31A, to the compressed configuration shown in FIG. 31B, the upper and lower link members 602 and 604 rotate in opposite directions, as indicated by arrows 660 and 662. As this is done, the rear wheel axle moves generally upwardly, as indicated by arrow 664, and the push rod 648 moves upwardly in the direction indicated by arrow 668 so as to compress the shock absorber 652.

Moreover, the counter-rotating action of the spaced apart upper and lower link members 602, 604 produces a rotational motion in the rear frame section, as indicated schematically by arrow 670, which has the desirable result of producing a effective reduction of unsprung weight/mass in the system, i.e., the rear frame section goes through rotational motion, as opposed to reciprocating motion, as the wheel works up and down. Moreover, braking forces generated by the rear brakes, whether against the seat stays 612 as by caliper brakes acting in a direction indicated by arrow 672 in FIG. 31A, or against the seat stays or chainstays, as by a disk brake acting in the direction indicated by arrow 674, also tends to impart rotational motion to the frame section in the direction indicated by arrow 670, so that (unlike conventional systems) its braking force also causes compression of the shock absorber unit 652, producing an anti-dive effect which counters the natural tendency of the bicycle to dive forwardly under hard braking.

Figure 32A:
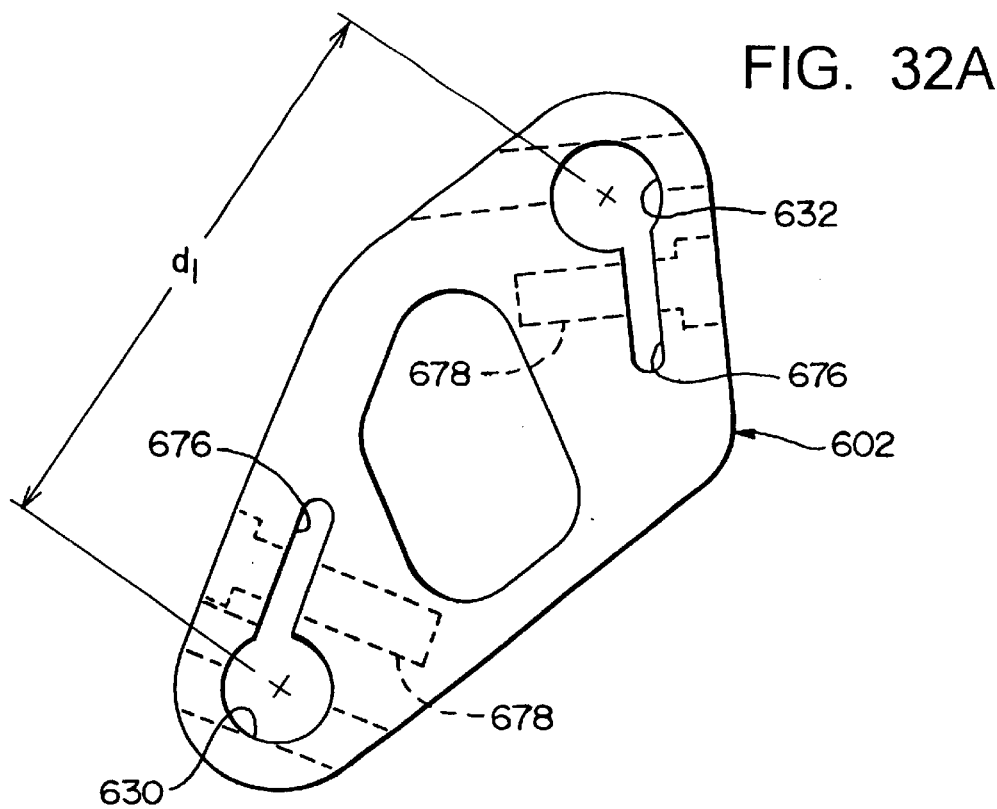
FIGS. 32A and 32B are, respectively, elevational views of the upper and lower link members of the suspension system of FIGS. 30–31B.
Figure 32B:
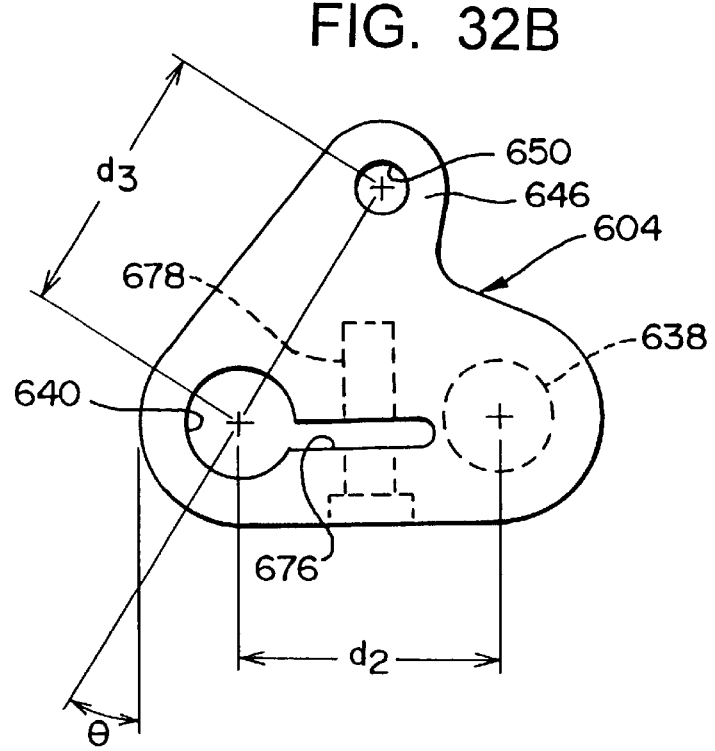

FIGS. 32A and 32B show, respectively, the upper and lower link members 602, 604 in enlarged detail. As can be seen, each of the pivot bores 630 is provided with an outwardly extending slot 676 and pinch bolt 678 by which the pivot bushings are secured in place. As can also be seen in FIG. 32B, a suitable spacing $d_3$ between the pivot axes of the bores 640 and 650 in a lower link 604 is about 0.470", with the line between bores 650 and 640 extending rearwardly at an angle θ of approximately 32.67°.

Suitably, both upper and lower links 602 and 604 may be fabricated of high strength aluminum alloy. Also, the vertical forward stays 626 should be constructed to have comparatively high strength so as to be able to bear the fairly high tension forces which are generated during operation of the system under competition conditions.

FIG. 33 shows a curve 680 in which the vertical axis of the represents the horizontal forward movement of the top link pivot 630 (i.e., towards the front of the frame) at 1" increments of vertical wheel movement; with reference to this plot, it should be understood that the term "vertical wheel movement" refers to movement of the rear wheel axis in a vertical direction, not the distance of movement along the curved wheel travel path itself. The horizontal axis of the graph, in turn, represents the horizontal movement of the lower link pivot 638 away from the frame at 1" increments of rear wheel vertical movement. Referring to the horizontal axis, it can be seen that the horizontal movement of the lower link (rearwardly away from the frame) is more predominant during the initial phase of upward suspension travel, and this rearward motion reduces or "tapers off" as compression of the suspension increases. One particularly advantageous effect of this movement is that the system provides an increasing spring rate with increasing compression of the suspension, since towards the upper limit of the travel there is comparatively greater motion (per inch of vertical wheel travel) of the bellcrank portion of the lower link in the forward direction toward the lower end of the shock absorber unit; in actual use, this translates to a suspension which provide a soft, cushioning ride at low compression, but which then stiffens to prevent the suspension from "bottoming out" at full compression.

As was noted above, the graph in FIG. 33 plots the forward and rearward movements of the upper and lower link member connection points to the rear frame section, and consequently it should be understood that this does not show the same movement as the wheel travel paths shown above. The embodiment which is shown in FIGS. 30–32B is capable of producing the full range of wheel travel paths described above, including the S-shaped curves with an inverse curve at the bottom and a positive curve at the top, as well as those curves which lack the inverse curve, but have a very large radius in the bottom section (approaching a straight line in some versions) which then transitions to a smaller diameter curve towards the top. Moreover, this embodiment of the suspension system of the present invention is particularly suited to producing those series of curves which have the large radius at the bottom which transitions to smaller radiuses towards the top, while using a compact, strong arrangement of components.

This subset of wheel travel paths (i.e., those curves which have a significantly larger radius at the bottom of the path than at the top) has the particular advantage of providing a high degree of pedal force cancellation at the bottom of the range of travel, without causing too much chainstay lengthening at the top of the travel, where it is not needed. This is particularly desirable in the case of those bicycles which use only a single front chain ring but still require a high-travel rear suspension, such as "downhill only" racing bikes. By providing a curve with the large radius at the bottom of the wheel path, the present invention provides a stable position for the wheel in order to counter movement of the suspension due to chain torque; by way of analogy, if the chain were to pull against a curve having a small radius, this would be like trying to balance a ball on top of a strongly convex surface, whereas the larger radius arc (which the present invention provides at the beginning of the wheel travel path)

acts more like balancing a ball on a comparatively flat surface, i.e., it is more stable. In order for this large radius to balance the forces correctly, it must have a focus point located at some height above the line from the drive gear axis to the driven wheel axis. However, if this large arc were to continue all the way to the upper part of the wheel path, this would cause too much chainstay lengthening effect at the upper limits of suspension compression and result in severe biopacing or pedal feedback when the wheel encounters bump forces. The present invention avoids this problem by forming a wheel travel path in which the radius of the arc becomes smaller as the wheel moves to the top of its travel, which in turn keeps the wheel from moving too far away from the drive gear in this phase of the travel.

In short, for these type of bicycles, the present invention has the advantage of providing a wheel path curve which has greater arc radius for the first part of the wheel travel and a smaller radius further along the wheel travel path. In addition to single drive-gear bicycles (including commuter, cruiser, and BMX bikes, in addition to the "downhill only" bicycles mentioned above), the advantages discussed in the preceding paragraph also benefit bicycles which use conventional, multiple drive-gears, although the benefits may not be quite as dramatic as in the case of a single drive gear.

It is clear from the foregoing that the present invention provides a unique wheel travel path having a lower curved portion in which there is an increasing rate of chainstay lengthening as the suspension compresses toward the preferred pedaling position, and a second curved portion above the preferred pedaling position in which there is a decreasing rate of chainstay lengthening, which yields the advantages which have been discussed above. The inventors have disclosed several embodiments of the present invention in which various mechanisms which are employed to generate the controlled wheel travel path; it will be understood that numerous modifications to and variations on these mechanisms will occur to those having ordinary skill in the art, and it should be understood that such will fall within the scope of the present invention. Moreover, in the illustrative embodiments which have been described herein, generation of the wheel path is principally a function of the lower pivot assembly; as a result, it will be understood that these and other lower pivot mechanisms which provide the prescribed path may be used in combination with other types of suitable upper suspension mechanisms, in addition to those which have been shown herein.

It is therefore to be recognized that these and many other modifications may be made to the illustrative embodiments of the present invention which are shown and discussed in this disclosure without departing from the spirit and scope of the invention. As just one example, in some embodiments the bearings of the pivot assemblies may be mounted to the eccentrics themselves, rather than to the supporting members.

What is claimed is:

1. A bicycle frame comprising:
   a chain drive, in which the distance from the axis of a drive sprocket to a rear wheel dropout is represented by a variable value CSL; and
   a compressible rear suspension having a linkage for moving said dropout along a controlled wheel travel path as said suspension is compressed, said controlled wheel travel path having an arc radius which is greater towards a lower end of said path and smaller towards an upper end of said path.

2. The bicycle frame of claim 1, wherein said controlled wheel travel path comprises:

a preferred pedaling position at a predetermined position Dp which is located along said wheel travel path;

a lower curve segment extending generally below said position Dp in which there is an increasing rate of chainstay lengthening with increasing compression of said suspension system, such that the first derivative relationship $$\frac{d[CSL]}{d(D)}$$

is a curve having a generally positive slope, so that the second derivative relationship $$\frac{d^2[CSL]}{(d(D))^2}$$

is generally positive; and an upper curve segment extending generally above said position Dp in which there is a decreasing rate of chainstay lengthening with increasing compression of said suspension system, such that the first derivative relationship $$\frac{d[CSL]}{d(D)}$$

is a curve having a generally negative slope, so that the second derivative relationship $$\frac{d^2[CSL]}{(d(D))^2}$$

is generally negative.

3. The bicycle frame of claim 1, wherein said linkage for moving said dropout along said controlled wheel travel path comprises:
   a rear frame section having a rearward end at which said dropout is located and a forward end; and
   a pivot mechanism mounted to a forward end of said rear frame section, said pivot mechanism comprising:
      upper and lower link members interconnecting said forward end of said rear frame section to a front frame section of said frame, said link members being configured to direct said dropout along said path in response to compression of said rear suspension.

4. The bicycle frame of claim 3, wherein each said link member comprises:
   a pivot end which is mounted to said front frame section; and
   an outer end which is mounted to said rear frame section.

5. The bicycle frame of claim 4, wherein said upper and lower link members are mounted so as to rotate in opposite directions as said rear suspension is compressed.

6. The bicycle frame of claim 5, wherein said upper link member is mounted so that said outer end thereof rotates in a forward and rearward direction in response to compression of said rear suspension, and said lower link member is mounted so that said outer end thereof rotates in a rearward and upward direction in response to compression of said rear suspension.

7. The bicycle frame of claim 6, wherein said upper link member has a primary axis from said first end to said outer end thereof which extends in a forward and downward direction when said rear suspension is in an uncompressed position, and said lower link member has a primary axis from said pivot end to said outer end which extends in a rearward and downward direction when said rear suspension is in said uncompressed position.

8. The bicycle frame of claim 7 wherein said pivot end of said upper link member is mounted to said front frame section in a position forward of an axis which extends from a seat to a bottom bracket of said frame, and said pivot end of said lower link member is mounted to said front frame section in a position rearward of said axis from said seat to said bottom bracket.

9. The bicycle frame of claim 8, wherein said rear suspension further comprises:
   a compressible shock absorber having a lower end mounted to said lower link member and an upper end mounted to said front frame section, so that said shock absorber is compressed between said upper and lower ends in response to compression of said rear suspension.

10. The bicycle frame of claim 9, wherein said lower link member comprises:
    a bifurcated link member having a first outer end which is mounted to said rear frame section, and a second outer end which is mounted to said lower end of said shock absorber.

11. The bicycle frame of claim 10, wherein said bifurcated link member has a secondary axis from said pivot end to said second outer end at an angle above said downwardly and rearwardly extending primary axis of said lower link member.

12. The bicycle frame of claim 11, wherein said angle at which said secondary axis of said lower link member extends above said primary axis thereof is in the range from about 5° to about 60°.

13. The bicycle frame of claim 11, wherein said angle at which said secondary axis of said lower link member extends above said primary axis thereof is in the range from about 32° to about 33°.

14. A bicycle frame comprising:
    a chain drive, in which the distance from the axis of a drive sprocket to a rear wheel dropout is represented by a variable value CSL; and
    a compressible rear suspension having a linkage for moving said dropout along a controlled wheel travel path as said suspension is compressed, said controlled wheel path having an arc radius which is greater towards a lower end of said path and smaller towards an upper end of said path;
    said linkage comprising:
        a rear frame section having a rearward end at which said dropout is located and a forward end; and
        a pivot mechanism mounted to a forward end of said rear frame section, said pivot mechanism comprising:
            an upper and lower link members interconnecting said forward end of said rear frame section to a front frame section of said frame;
            said upper link member having a pivot end which is mounted to said forward frame section forward of an axis which extends from a seat to a bottom bracket of said frame and an outer end which is mounted to said rear frame section; and
            said lower link member having a pivot end which is mounted to said forward frame section rearward of said axis which extends from said seat to said bottom bracket and an outer end which is mounted to said rear frame section;
            said upper link member having an axis from said pivot end to said outer end thereof which extends in a downward forward direction when said suspension is in an uncompressed position, and said lower link member having an axis from said pivot end to said outer end thereof which extends in a downward and rearward direction when said suspension is in said uncompressed position, said link members further being mounted so as to rotate in opposite directions as said suspension is compressed; and
            said controlled wheel travel path having an arc radius which is greater towards a lower end of said path and smaller towards an upper end of said path.

15. The bicycle frame of claim 14, wherein said rear suspension further comprises:
    a compressible shock absorber having a lower end mounted to said lower link member and an upper end mounted to said front frame section, so that said shock absorber is compressed between said upper and lower ends in response to compression of said rear suspension.

16. A bicycle frame including a drive sprocket and a rear wheel dropout, comprising:
    a chain drive, in which the distance from an axis of said drive sprocket to said dropout is variable; and
    a rear wheel suspension means functioning to control movement of said dropout alone a wheel travel path as said suspension means is compressed, said travel path having an arc radius which is greater towards a lower end of said path and smaller towards an upper end of said path.

17. A bicycle frame as described in claim 16 wherein said rear wheel suspension means includes a linkage; said linkage including a rear frame section having a rearward end at which said dropout is located and a forward end, and a pivot means being mounted to said forward end, said pivot means including at least one link member functioning to control said movement of said rear wheel dropout along said wheel travel path.

18. A bicycle frame as described in claim 17, wherein said pivot means includes two link members, each having a pivot end that is mounted to said front frame section and an outer end which is mounted to said rear section, and wherein said link members are mounted to rotate in opposite directions as said rear wheel suspension is compressed.

19. A bicycle frame as described in claim 18 wherein said rear wheel suspension further includes a shock absorber means being mounted within said linkage and functioning to control the motion of said linkage in response to compression of said rear wheel suspension.

20. A bicycle frame comprising:
    a chain drive, in which the distance from the axis of a drive sprocket to a rear wheel dropout is a variable value;
    a rear frame section having a rearward end at which said dropout is located and a forward end;
    a compressible rear suspension having a linkage for moving said dropout along a wheel travel path as said suspension is compressed;
    said linkage including:
        a pivot mechanism mounted to a forward end of said rear frame section, said pivot mechanism including upper and lower link members interconnecting said forward end of said rear frame section to a front frame section of said frame, said link members being configured to direct said dropout along said path in response to compression of said rear suspension;

each said link member including a pivot end which is mounted to said front frame section and an outer end which is mounted to said rear frame section; and wherein said upper and lower link members are mounted so as to rotate in opposite directions as said rear suspension is compressed.

21. The bicycle frame of claim 20, wherein said upper link member is mounted so that said outer end thereof rotates in a forward and upward direction in response to compression of said rear suspension, and said lower link member is mounted so that said outer end thereof rotates in a rearward and upward direction in response to compression of said rear suspension.

22. The bicycle frame of claim 21, wherein said upper link member has a primary axis from said pivot end to said outer end thereof which extends in a downward direction when said rear suspension is in an uncompressed position, and said lower link member has a primary axis from said pivot end to said outer end thereof which extends in a rearward and downward direction when said rear suspension is in said uncompressed position.

23. The bicycle frame of claim 22 wherein said pivot end of said upper link member is mounted to said front frame section in a position forward of an axis which extends from a seat to a bottom bracket of said frame, and said pivot end of said lower link member is mounted to said front frame section in a position rearward of said axis from said seat to said bottom bracket.

24. The bicycle frame of claim 23, wherein said rear suspension further comprises:

a compressible shock absorber having a lower end mounted to said lower link member and an upper end mounted to said front frame section, so that said shock absorber is compressed between said upper and lower ends in response to compression of said rear suspension.

25. The bicycle frame of claim 24, wherein said lower link member comprises:

a bifurcated link member having a first outer end which is mounted to said rear frame section, and a second outer end which is mounted to said lower end of said shock absorber.

26. The bicycle frame of claim 25, wherein said bifurcated link member has a secondary axis from said pivot end to said second outer end at an angle above said downwardly and rearwardly extending primary axis of said lower link member.

27. The bicycle frame of claim 26, wherein said angle at which said secondary axis of said lower link member extends above said primary axis thereof is in the range of from about 5° to about 60°.

28. The bicycle frame of claim 26, wherein said angle at which said secondary axis of said lower link member extends above said primary axis thereof is in the range of from about 32° to about 33°.

29. The bicycle frame of claim 20, wherein said upper link member is mounted so that said outer end thereof rotates in a clockwise direction in response to compression of said rear suspension, and said lower link member is mounted so that said outer end thereof rotates in a counterclockwise direction in response to compression of said rear suspension.

30. The bicycle frame of claim 29, wherein said upper link member has a primary axis from said pivot end to said outer end thereof which extends in a downward direction when said rear suspension is in an uncompressed position, and said lower link member has a primary axis from said pivot end to said outer end thereof which extends in a rearward and downward direction when said rear suspension is in said uncompressed position.

31. The bicycle frame of claim 30 wherein said pivot end of said upper link member is mounted to said front frame section in a position forward of an axis which extends from a seat to a bottom bracket of said frame, and said pivot end of said lower link member is mounted to said front frame section in a position rearward of said axis from said seat to said bottom bracket.

32. A bicycle frame comprising:

a front frame section and a rear frame section; said rear frame section including a triangular assembly having a chain stay member, a seat stay member, and a front stay member; wherein a lower apex is formed by said chain stay member and said front stay member, an upper apex is formed by said front stay member and said seat stay member, and a rear apex is formed by said chain stay a member and said seat stay member, and wherein a rear wheel dropout is located at said rear apex;

a chain drive, in which the distance from the axis of a drive sprocket to said dropout is a variable value;

a compressible rear suspension having a linkage for moving said dropout along a wheel travel path as said suspension is compressed; said linkage including:

upper and lower link members interconnecting said rear frame section to said front frame section, said link members being configured to direct said dropout along said path in response to compression of said rear suspension;

each said link member including a pivot end which is mounted to said front frame section and an outer end which is mounted to said rear frame section; wherein said outer end of said lower link member is mounted proximate said lower apex, and said outer end of said upper link is mounted proximate said upper apex.

33. The bicycle frame of claim 32 wherein said pivot end of said upper link member is mounted to said front frame section in a position forward of an axis which extends from a seat to a bottom bracket of said frame, and said pivot end of said lower link member is mounted to said front frame section in a position rearward of said axis from said seat to said bottom bracket.

34. The bicycle frame of claim 33, wherein said upper apex moves in a forward direction, and said lower apex moves in a rearward direction in response to compression of said rear suspension.

35. The bicycle frame of claim 34, wherein said upper link member is mounted so that said outer end thereof rotates in a clockwise direction in response to compression of said rear suspension, and said lower link member is mounted so that said outer end thereof rotates in a counterclockwise direction in response to compression of said rear suspension.

36. The bicycle frame of claim 35, wherein said upper link member has a primary axis from said pivot end to said outer end thereof which extends in a downward direction when said rear suspension is in an uncompressed position, and said lower link member has a primary axis from said pivot end to said outer end thereof which extends in a rearward and downward direction when said rear suspension is in said uncompressed position.

* * * * *